(12) United States Patent
Bauer et al.

(10) Patent No.: US 10,363,572 B2
(45) Date of Patent: Jul. 30, 2019

(54) METHOD FOR PRODUCING A MULTICOAT PAINT SYSTEM ON PLASTICS SUBSTRATES

(71) Applicant: BASF Coatings GmbH, Muenster (DE)

(72) Inventors: Juergen Bauer, Graefelfing (DE); Audree Andersen, Havixbeck (DE); Hardy Reuter, Muenster (DE); Roland Ratz, Everswinkel (DE); Marita Buermann, Muenster (DE); Sina Winnen, Munich (DE); Vera Diepenbrock, Everswinkel (DE)

(73) Assignee: BASF Coatings GmbH, Muenster (DE)

( * ) Notice: Subject to any disclaimer, the term of this patent is extended or adjusted under 35 U.S.C. 154(b) by 0 days.

(21) Appl. No.: 15/571,515

(22) PCT Filed: Mar. 31, 2016

(86) PCT No.: PCT/EP2016/057007
§ 371 (c)(1),
(2) Date: Nov. 3, 2017

(87) PCT Pub. No.: WO2016/177515
PCT Pub. Date: Nov. 10, 2016

(65) Prior Publication Data
US 2018/0141084 A1 May 24, 2018

(30) Foreign Application Priority Data

May 6, 2015 (EP) ..................... 15166548

(51) Int. Cl.
*B05D 1/04* (2006.01)
*B05D 7/00* (2006.01)
*B05D 7/02* (2006.01)
*B05D 7/14* (2006.01)
*C08G 18/08* (2006.01)
*C08G 18/10* (2006.01)
*C08G 18/32* (2006.01)
*C08G 18/75* (2006.01)
*C08L 23/16* (2006.01)
*C08L 51/08* (2006.01)
*C08L 67/02* (2006.01)
*C09D 175/00* (2006.01)

(52) U.S. Cl.
CPC ............ *B05D 7/532* (2013.01); *B05D 1/04* (2013.01); *B05D 7/02* (2013.01); *B05D 7/14* (2013.01); *B05D 7/572* (2013.01); *C08G 18/0823* (2013.01); *C08G 18/10* (2013.01); *C08G 18/3256* (2013.01); *C08G 18/758* (2013.01); *C09D 175/00* (2013.01); *B05D 2201/02* (2013.01); *B05D 2401/20* (2013.01); *B05D 2503/00* (2013.01); *B05D 2507/02* (2013.01); *C08L 23/16* (2013.01)

(58) Field of Classification Search
CPC ........... B05D 7/14; B05D 7/532; B05D 7/572

USPC ........................................ 427/409
See application file for complete search history.

(56) References Cited

U.S. PATENT DOCUMENTS

| 4,108,814 A * | 8/1978 | Reiff ............... C08G 18/0828 524/840 |
| 4,292,226 A * | 9/1981 | Wenzel ............ C08G 18/0804 428/423.4 |
| 4,501,852 A * | 2/1985 | Markusch ......... C08G 18/0819 524/591 |
| 4,822,685 A | 4/1989 | Perez et al. |
| 5,389,718 A * | 2/1995 | Potter ............... C08G 18/0819 524/591 |
| 6,642,303 B2 * | 11/2003 | Schutze ............ C08G 18/0823 428/423.1 |
| 2006/0128859 A1 | 6/2006 | Muller |
| 2006/0292306 A1 | 12/2006 | Goebel et al. |
| 2015/0175840 A1 | 6/2015 | Flosbach et al. |

FOREIGN PATENT DOCUMENTS

| DE | 40 09 858 A1 | 10/1991 |
| DE | 44 37 535 A1 | 4/1996 |
| DE | 199 30 665 A1 | 1/2001 |
| EP | 0 319 927 A2 | 6/1989 |
| EP | 1 736 246 A1 | 12/2006 |
| EP | 1 534 792 B1 | 5/2007 |
| JP | 08283612 A * | 10/1996 |
| JP | 2003-511498 | 3/2003 |
| JP | 2012-529547 | 11/2012 |
| WO | WO 91/15528 A1 | 10/1991 |
| WO | WO 2004/035646 A1 | 4/2004 |
| WO | WO 2014/007915 A1 | 1/2014 |
| WO | WO-2014007915 A1 * | 1/2014 ............ B05D 7/53 |

(Continued)

OTHER PUBLICATIONS

Gel Fraction. Retrieved from https://web.archive.org/web/20130506024905/http://www.kansaialtan.com/en/terms/ara/Gel%20Fraction on Sep. 16, 2018. 1 page (Year: 2013).*

(Continued)

*Primary Examiner* — William P Fletcher, III
(74) *Attorney, Agent, or Firm* — Oblon, McClelland, Maier & Neustadt, L.L.P.

(57) ABSTRACT

The present invention relates to a method for producing a multicoat paint system on a plastics substrate, in which a basecoat film or a plurality of directly successive basecoat films are produced on a plastics substrate, a clearcoat film is produced directly on the one basecoat film or on the topmost of the plurality of basecoat films, and subsequently the one or more basecoat films and the clearcoat film are jointly cured, this method being a method wherein at least one basecoat material used for the production of the basecoat films comprises at least one aqueous polyurethane-polyurea dispersion (PD) comprising polyurethane-polyurea particles, where the polyurethane-polyurea particles present in the dispersion (PD) comprise anionic groups and/or groups which can be converted into anionic groups, and have an average particle size of 40 to 2000 nm and also a gel fraction of at least 50%.

15 Claims, No Drawings

(56) References Cited

FOREIGN PATENT DOCUMENTS

| WO | WO 2014/033135 A2 | 3/2014 |
|---|---|---|
| WO | WO 2015/007427 A1 | 1/2015 |
| WO | WO 2015/029627 A1 | 3/2015 |

OTHER PUBLICATIONS

Noble, Karl-Ludwig, "Waterborne polyurethanes," Progress in Organic Coatings 32 (1997) 131-136. (Year: 1997).*
Howarth, G.A., "Polyurethanes, polyurethane dispersions and polyureas: Past, present and future," Surface Coatings International Part B: Coating Transactions, vol. 86, B2, 91-168, Jun. 2003. (Year: 2003).*
International Search Report and Written Opinion dated Jun. 2, 2016 in PCT/EP2016/057007.
Extended European Search Report dated Nov. 9, 2015 in Patent Application No. 15166548.6.

* cited by examiner

METHOD FOR PRODUCING A MULTICOAT PAINT SYSTEM ON PLASTICS SUBSTRATES

CROSS-REFERENCE TO RELATED APPLICATIONS

This application is a National Stage of PCT/EP2016/057007, which was filed on Mar. 31, 2016. This application is based upon and claims the benefit of priority to European Application No. 15166548.6, which was filed on May 6, 2015.

The present invention relates to a method for producing a multicoat paint system on plastics substrates, in which a basecoat film or a plurality of directly successive basecoat films are produced on a plastics substrate, a clearcoat film is produced directly on the one basecoat film or the topmost of the plurality of basecoat films, and then the one or more basecoat films and the clearcoat film are jointly cured. The present invention additionally relates to a multicoat paint system which has been produced by the method of the invention. The method may find application, for example, in the field of vehicle finishing, as for example in the finishing of vehicle parts and vehicle accessory parts.

PRIOR ART

Within vehicle finishing, plastics have become established as materials for vehicle parts, and also for components and accessories for installation in and on vehicles, both in the interior and on the exterior. Plastics, like other materials, are coated, or painted or finished, with corresponding coating compositions such as basecoat materials and clearcoat materials, for decorative reasons (providing color, for example) and/or for technical usefulness (light stability and weather resistance, for example). While the basecoat film produced by the application of a corresponding basecoat material is primarily responsible for the generation of esthetic properties such as the color and/or effects such as the flop, the clearcoat film which is generally produced on the basecoat film serves in particular for scratch resistance and also for the gloss of the multicoat paint system then present.

An important prerequisite for a high-quality coating is the adhesion to the substrate, in other words to the substrate surface. It is general knowledge that in the coating or painting/finishing of plastics, specifically, and more particularly of nonpolar plastics, such as polypropylene (PP) in pure form or in modified form (as a result of the addition, for example, of ethylene-propylene-diene copolymers (EPDM)), problems of adhesion, in some cases severe, to the plastics substrate may occur. In order to achieve acceptable adhesion of the coating composition in question, nonpolar plastics of these kinds are conventionally subjected to a surface-activating pretreatment. The techniques most frequently employed are flaming, plasma treatment, and corona discharge. Also known is the use of certain primer-surfacers or of adhesion primers, which among other things may contribute to improving the adhesion of any subsequent coat system. Primer-surfacers or adhesion primers of these kinds are applied to the plastics substrate in a separate coating operation, before the above-described system of basecoat film and clearcoat film is then produced thereon.

Even in the case of surface-activating pretreatment and/or the production of primer-surfacer coats or adhesion primer coats, the adhesion of coatings to plastics substrates is not always sufficient, meaning that these coats successively detach from the substrate as a result, for example, of effects of weathering or mechanical stress. When using aqueous coating compositions, which are becoming more and more established even in the coating of plastics, for environmental reasons, the problems of adhesion are exacerbated, especially those affecting the finishing of nonpolar plastics substrates, owing to the differences in polarity of the two media, the plastics substrate and the coating composition.

A challenge that is relevant accordingly for the automobile industry is therefore that of finding methods which, by fine tuning of method parameters and coating compositions employed, allow the production of multicoat paint systems which exhibit outstanding adhesion on plastics substrates.

OBJECT OF THE INVENTION

It was an object of the present invention, therefore, to provide a method for producing a multicoat paint system on plastics substrates, where the common system of basecoat film and clearcoat film can be produced, but which at the same time ensures outstanding adhesion of the multicoat system to the substrate. This ought to be possible despite the fact that the basecoat films ought to be produced through the use of aqueous basecoat materials.

It has been found that the stated objects can be achieved by a specific new method for producing a paint system (M) on a plastics substrate (S), this method comprising the following steps:

(1) producing (1.1) a basecoat film (B.1.1) or (1.2) a plurality of directly successive basecoat films (B.1.2.x) on the plastics substrate (S) by (1.1) applying an aqueous basecoat material (b.1.1) to the substrate (S) or (1.2) directly successively applying a plurality of basecoat materials (b.1.2.x) to the substrate, (2) producing a clearcoat film (K) directly on (2.1) the basecoat film (B.1.1) or (2.2) a topmost basecoat film (B.1.2.x) by applying a clearcoat material (k) directly to (2.1) the basecoat film (B.1.1) or (2.2) the topmost basecoat film (B.1.2.x), (3) jointly curing the (3.1) basecoat film (B.1.1) and the clearcoat film (K) or (3.2) the basecoat films (B.1.2.x) and the clearcoat film (K), wherein the basecoat material (b.1.1) or at least one of the basecoat materials (b.1.2.x) comprises at least one aqueous polyurethane-polyurea dispersion (PD) comprising polyurethane-polyurea particles, where the polyurethane-polyurea particles present in the dispersion (PD) comprise anionic groups and/or groups which can be converted into anionic groups, and have an average particle size of 40 to 2000 nm and also a gel fraction of at least 50%.

The abovementioned method is also referred to hereinafter as method of the invention, and accordingly forms part of the subject matter of the present invention. Preferred embodiments of the method of the invention can be found in the description which follows below and in the dependent claims.

Further provided by the present invention is a multicoat paint system on a plastics substrate, this system having been produced using the method of the invention.

The method of the invention permits the production of multicoat paint systems on plastics substrates that comprise the usual system of basecoat film and clearcoat film and at the same time exhibit outstanding adhesion on the plastics substrate.

DETAILED DESCRIPTION

First of all, some of the terms used in the present invention will be elucidated.

The application of a coating composition to a substrate, or the production of a coating film on a substrate, are understood as follows. The respective coating composition is applied in such a way that the coating film produced therefrom is arranged on the substrate, but need not necessarily be in direct contact with the substrate. Other layers, for example, may also be arranged between the coating film and the substrate. In stage (1) of the method of the invention, for example, a basecoat film is produced at any rate on the plastics substrate (S), although between the substrate and the basecoat film there may also be at least one further coat, as for example a primer-surfacer coat or adhesion primer coat.

The same principle applies to the application of a coating composition (b) to a coating film (A) produced by means of another coating composition (a) (i.e., the production of a coating film (B) on another coating film (A)). The coating film (B) need not necessarily be in contact with the coating film (A), but merely has to be arranged above it, i.e., on the side of the coating film (A) facing away from the substrate.

In contrast, the application of a coating composition directly to a substrate, or the production of a coating film directly on a substrate, is understood as follows. The respective coating composition is applied in such a way that the coating film produced therefrom is arranged on the substrate and is in direct contact with the substrate. Thus, more particularly, no other layer is arranged between coating film and substrate.

The same of course applies to the application of a coating composition (b) directly to a coating film (A) produced by means of another coating composition (a) (that is, the production of a coating film (B) directly on another coating film (A)). In this case, the two coating films are in direct contact, i.e. are arranged directly one on top of the other. More particularly, there is no further coat between the coating films (A) and (B). Of course, the same principle applies to directly successive application of coating compositions, or the production of directly successive coating films.

In the context of the present invention, "flashing off", "intermediate drying" and "curing" are understood to have the meanings familiar to the person skilled in the art in connection with methods for production of multicoat paint systems.

Thus, the term "flashing off" is understood in principle as a designation for the evaporation or vaporization of organic solvents and/or water in a coating composition applied in the production of a paint system, usually at ambient temperature (i.e., room temperature), for example 15 to 35° C. for a period of 0.5 to 30 minutes, for example. In the course of flashing off, then, organic solvents and/or water present in the applied coating composition undergo evaporation. Since the coating composition is still free-flowing at least directly after the application and on commencement of the flash-off operation, it can flow during the flash-off operation. This is because at least a coating composition applied by spray application is generally applied in droplet form and not in homogeneous thickness. However, it is free-flowing by virtue of the organic solvents and/or water present and can thus form a homogeneous, smooth coating film by flowing. At the same time, organic solvents and/or water vaporize gradually, such that a comparatively smooth coating film has formed after the flash-off phase, containing less water and/or solvent compared to the coating composition applied. After the flash-off operation, the coating film, however, is still not in a state ready for use. For example, it is no longer free-flowing, but is still soft and/or tacky, and in some cases only partly dried. More particularly, the coating film still has not cured as described below.

Intermediate drying is thus likewise understood to mean the evaporation or vaporization of organic solvents and/or water in a coating composition applied in the production of a paint system, usually at a temperature elevated relative to the ambient temperature, of 40 to 90° C., for example, for a period of 1 to 20 minutes, for example. In the case of intermediate drying as well, therefore, the applied coating composition will lose a fraction of organic solvents and/or water. With regard to a particular coating composition, it is generally the case that the intermediate drying, compared to the flash-off, takes place at, for example, higher temperatures and/or for a longer period, such that, in comparison to the flash-off, a higher proportion of organic solvents and/or water escapes from the coating film applied. However, the intermediate drying does not give a coating film in a state ready for use either, i.e. a cured coating film as described below. A typical sequence of flash-off and intermediate drying operations would involve, for example, flashing off a coating film applied at ambient temperature for 10 min and then intermediately drying it at 80° C. for 10 min. However, no conclusive delimitation of the two terms is either necessary or intended. For pure ease of comprehension, these terms are used in order to make it clear that the curing described below may be preceded by variable and sequential conditioning of a coating film. Here, depending on the coating composition, the evaporation temperature and the evaporation time, more or less high proportions of the organic solvents and/or water present in the coating composition may undergo evaporation. As the case may be, a proportion of the polymers present in the coating compositions as binders, even at this early stage, can crosslink or interloop as described below. However, neither the flash-off nor the intermediate drying operation gives a ready-to-use coating film, as is accomplished by the curing described below. Accordingly, curing is clearly delimited from the flash-off and intermediate drying operations.

Accordingly, curing of a coating film is understood to mean the conversion of such a film to the ready-to-use state, i.e. to a state in which the substrate provided with the respective coating film can be transported, stored and used as intended. More particularly, a cured coating film is no longer soft or tacky, but has been conditioned as a solid coating film which does not undergo any further significant change in its properties, such as hardness or adhesion on the substrate, even under further exposure to curing conditions as described below.

As is well known, coating compositions can in principle be cured physically and/or chemically, according to the components present, such as binders and crosslinking agents. In the case of chemical curing, thermochemical curing is contemplated in particular. If it is thermochemically curable, a coating composition may be self-crosslinking and/or externally crosslinking. The statement that a coating composition is self-crosslinking and/or externally crosslinking in the context of the present invention should be understood to mean that this coating composition comprises polymers as binders and optionally crosslinking agents, which can correspondingly crosslink with one another. The underlying mechanisms and usable binders and crosslinking agents are described below.

In the context of the present invention, "physically curable" or the term "physical curing" means the formation of a cured coating film through release of solvent from polymer solutions or polymer dispersions, the curing being achieved through interlooping of polymer chains. Such coating compositions are generally formulated as one-component coating compositions.

In the context of the present invention, "thermochemically curable" or the term "thermochemical curing" means the crosslinking, initiated by chemical reaction of reactive functional groups, of a paint film (formation of a cured coating film), it being possible to provide the activation energy for these chemical reactions through thermal energy. This can involve reaction of different, mutually complementary functional groups with one another (complementary functional groups) and/or formation of the cured layer based on the reaction of autoreactive groups, i.e. functional groups which inter-react with groups of the same kind. Examples of suitable complementary reactive functional groups and autoreactive functional groups are known, for example, from German patent application DE 199 30 665 A1, page 7 line 28 to page 9 line 24.

This crosslinking may be self-crosslinking and/or external crosslinking. If, for example, the complementary reactive functional groups are already present in an organic polymer used as a binder, for example a polyester, a polyurethane or a poly(meth)acrylate, self-crosslinking is present. External crosslinking is present, for example, when a (first) organic polymer containing particular functional groups, for example hydroxyl groups, reacts with a crosslinking agent known per se, for example a polyisocyanate and/or a melamine resin. The crosslinking agent thus contains reactive functional groups complementary to the reactive functional groups present in the (first) organic polymer used as the binder.

Especially in the case of external crosslinking, the one-component and multicomponent systems, especially two-component systems, known per se are useful.

In thermochemically curable one-component systems, the components to be crosslinked, for example organic polymers as binders and crosslinking agents, are present alongside one another, i.e. in one component. A prerequisite for this is that the components to be crosslinked react with one another, i.e. enter into curing reactions, only at relatively high temperatures of, for example, above 100° C. Otherwise, the components to be crosslinked would have to be stored separately from one another and only be mixed with one another shortly before application to a substrate, in order to avoid premature, at least partial thermochemical curing (cf. two-component systems). An example of a combination is that of hydroxy-functional polyesters and/or polyurethanes with melamine resins and/or blocked polyisocyanates as crosslinking agents.

In thermochemically curable two-component systems, the components to be crosslinked, for example the organic polymers as binders and the crosslinking agents, are present separately from one another in at least two components, which are combined only shortly prior to application. This form is chosen when the components to be crosslinked react with one another even at ambient temperatures or slightly elevated temperatures of between 40 to 100° C. An example of a combination is that of hydroxy-functional polyesters and/or polyurethanes and/or poly(meth)acrylates with free polyisocyanates as crosslinking agents.

It is also possible that an organic polymer as binder has both self-crosslinking and externally crosslinking functional groups, and is then combined with crosslinking agents.

Of course, in the curing of a coating composition characterized as thermochemically curable, it is always also possible for physical curing to occur, i.e. interlooping of polymer chains. Nevertheless, such a coating composition is described as thermochemically curable in that case.

It follows from the above that, according to the nature of the coating composition and the components present therein, curing is brought about by different mechanisms which, of course, also necessitate different conditions in the curing, more particularly different curing temperatures and curing times.

In the case of a purely physically curable coating composition, curing takes place preferably between 15 and 100° C., preferably between 40 and 100° C. over a period of, for example, 5 minutes to 48 hours, preferably 10 to 60 minutes. In this case curing differs from the flashing off and/or intermediate drying, accordingly, possibly only in the duration of the conditioning of the coating film.

In the case of thermochemically curable coating compositions, the following applies. The thermochemical curing of thermochemically curable one-component systems is carried out preferably at temperatures of 100 to 200° C., preferably 120 to 200° C., for a period of to 60 minutes, preferably 15 to 50 minutes, since these conditions are generally necessary in order to convert the coating film into a thermochemically cured coating film through chemical crosslinking reactions. Accordingly, any flash-off and/or intermediate-drying phase which precedes the thermochemical curing takes place at lower temperatures and/or for shorter times.

The thermochemical curing of thermochemically curable two-component systems is carried out at temperatures of, for example, between 15 and 100° C., preferably between 40 and 100° C., for a period of 5 to 80 minutes, preferably 10 to 60 minutes. In turn it is the case that any flash-off and/or intermediate-drying phase which precedes the thermochemical curing takes place in that case at lower temperatures and/or for shorter times.

It is equally possible for a coating composition which in principle is thermochemically curable to be cured only physically. For instance, a thermochemically curable one-component coating composition, which comprises for example a combination of hydroxy-functional binders and typical aminoplast resins and which cures chemically only at temperatures of more than 100° C., for example, may be cured physically at only 80° C. The chemical crosslinking which may then occur to a very small extent is in this case negligible. Through the combination of corresponding polymeric binders and aminoplast resins, which are then present in purely physically cured form in the cured coating, certain profiles of properties, for example, may be achieved.

Since ultimately this is a purely physical curing, the curing differs in this case from the flashing off and/or the intermediate drying, therefore, possibly again only in the duration of the conditioning of the coating film.

Also possible is the following: If, in the context of the method of the invention, for example, a fundamentally thermochemically curable one-component basecoat material is selected, and if it is used to produce a basecoat film or topmost basecoat film, then a clearcoat material is applied directly to said film. To conclude, the two films are cured together. Where the clearcoat material is a thermochemically curable two-component coating composition, as is preferred, the concluding curing may take place at 80° C., for example.

The clearcoat material in this case is thermochemically cured, whereas the components present in the applied basecoat material are only able to cure physically at this temperature.

All the temperatures elucidated in the context of the present invention are understood as the temperature of the room in which the coated substrate is present. What is thus not meant is that the substrate itself must have the particular temperature.

Depending on the plastics substrate used, it must of course be ensured, in the context of the method of the invention, that the substrate, during the curing of coating films applied thereon, is not heated to such an extent that it undergoes decomposition or deformation. Common plastics substrates, particularly those which are used in the context of vehicle finishing, however, generally lack dimensional stability at temperatures of 100° C. and above. Accordingly, the curing of coating films as part of the present invention is carried out preferably at below 100° C.

It also follows from the above that in the context of the present invention, preference is given to carrying out the following curing operations. Physically curing coating compositions and thermochemically curable externally crosslinking one-component coating compositions are cured physically; thermochemically curable externally crosslinking two-component coating compositions are cured thermochemically. The reason is that this ensures that the substrate must be heated only to temperatures of less than 100° C. It is therefore preferred for any curing operations as part of the method of the invention to be carried out at below 100° C., more preferably at not more than 90° C.

If reference is made in the context of the present invention to an official standard without reference to the official period of validity, this of course means the version of the standard current at the filing date or, if no current version exists at this date, the last current version.

The Method of the Invention

In the method of the invention, a multicoat paint system is constructed on a plastics substrate (S).

Plastics substrates (S) that are suitable include customary plastics, examples being polystyrene (PS), polyvinyl chloride (PVC), polyurethane (PU), glass fiber-reinforced unsaturated polyesters, polymethyl methacrylate (PMMA), polyphenylene sulfide (PPS), polyoxymethylene (POM), polyphenylene ethers (PPE), polyphenylene oxide (PPO), polyurea, polybutadiene terephthalate (PBT), polycarbonate (PC), acrylonitrile-butadiene-styrene copolymers (ABS), and polyolefins such as polypropylene (PP). Also possible here are plastics substrates which comprise various of the plastics stated, in other words mixtures of these plastics. Reference may be made by way of example to polypropylene (PP), modified with ethylene-propylene-diene copolymers (EPDM), (PP/EPDM blends). Preferred PP/EPDM blends have EPDM fractions of not more than 25 wt %, for example, more particularly not more than 20 wt %.

The plastics substrates may be simple plastics sheets. Also possible as substrates, however, are vehicle bodies made of plastics, or particular vehicle parts and also vehicle components and accessories for installation in or on vehicles, for both the interior and the exterior vehicle sectors.

The substrates may be pretreated in a conventional way. Suitable pretreatments include, in particular, surface-activating pretreatments such as flaming, plasma treatment, and corona discharge, more particularly flaming.

As an alternative or in addition to the surface-activating pretreatment described, the substrates may be provided with adhesion primer and/or primer-surfacer coatings, which are known in principle. Corresponding coating compositions are known and may be applied, for example, directly to the substrate, which may have undergone a surface-activating pretreatment, and these coating compositions may then be cured. It is especially advantageous, however, that in the context of the method of the invention, it is possible to do entirely without the use of a primer-surfacer or adhesion primer, and yet to obtain outstanding adhesion properties.

In stage (1) of the method of the invention, (1.1) a basecoat film (B.1.1) is produced or (1.2) a plurality of directly successive basecoat films (B.1.2.x) are produced. The films are produced by applying (1.1) an aqueous basecoat material (b.1.1) to the plastics substrate (S) or (1.2) directly successively applying a plurality of basecoat materials (b.1.2.x) to the plastics substrate (S).

The basecoat materials may be applied directly to the substrate, in other words between the optionally surface-activating pretreated substrate and the basecoat material (b.1.1), or to the first (i.e. bottommost) of the basecoat materials (b.1.2.x) there are no further films arranged. It is nevertheless equally possible for at least one other coating film, such as a primer-surfacer film, to be produced first of all on the substrate. Since, however, outstanding adhesion is achieved despite the omission of such other coating films, and since such omission results in a massive simplification of the method, it is preferred for the basecoat material (b.1.1) or the first basecoat material (b.1.2.x) to be applied directly to the plastics substrate, where appropriate after surface-activating pretreatment of said substrate.

The directly successive application of a plurality of basecoat materials (b.1.2.x) to the substrate (S) is thus understood to mean that a first basecoat material is first applied to the substrate and thereafter a second basecoat material is applied directly to the film of the first basecoat material. Any third basecoat material is then applied directly to the film of the second basecoat material. This operation can then be repeated analogously for further basecoat materials (i.e. a fourth, fifth, etc. basecoat).

The terms "basecoat film" and "basecoat" in relation to the coating compositions applied and coating films produced in stage (1) of the method of the invention are used for the sake of better clarity. A basecoat material is a color-imparting intermediate coating material that is used in automotive finishing and general industrial painting. To protect a basecoat film from environmental effects in particular, at least one additional clearcoat film is generally applied over it, and this is also the case in the method of the invention as well. Curing then takes place, finally, together with the clearcoat.

The basecoat materials (b.1.1) and (b.1.2.x) are described in detail later on below. Preferably, however, they are physically curable basecoat materials and/or thermochemically curable, externally crosslinking, one-component basecoat materials.

The basecoat material (b.1.1) and the basecoat materials (b.1.2.x) can be applied by methods known to those skilled in the art for the application of liquid coating compositions, as for example by dipping, knifecoating, spraying, rolling, or the like. Preference is given to employing spray application methods, for example compressed air spraying (pneumatic application), airless spraying, high-speed rotation, electrostatic spray application (ESTA), optionally in association with hot spray application such as hot air spraying, for example. Very preferably, the basecoat materials are applied via pneumatic spray application or via electrostatic spray application.

The application of the basecoat material (b.1.1) thus produces a basecoat film (B.1.1), i.e. a coat of the basecoat material (b.1.1) applied on the plastics substrate (S).

In stage (1.2) of the method of the invention, the naming system which follows is suggested. The basecoat materials and basecoat films are designated generally by (b.1.2.x) and (B.1.2.x), while the x can be replaced by different, correspondingly appropriate letters in the naming of the specific individual basecoat materials and basecoat films.

The first basecoat material and the first basecoat film can be designated by a, and the topmost basecoat material and the topmost basecoat film can be designated by z. These two basecoat materials or basecoat films are always present in stage (1.2). Any coats arranged inbetween can be designated serially with b, c, d and so forth.

The application of the first basecoat material (b.1.2.a) thus produces a basecoat film (B.1.2.a) on the plastics substrate (S). The at least one further basecoat film (B.1.2.x) is then produced directly on the basecoat film (B.1.2.a). If a plurality of further basecoat films (B.1.2.x) are produced, they are produced in direct succession.

The basecoat materials (b.1.2.x) may be identical or different. It is also possible to produce a plurality of basecoat films (B.1.2.x) with the same basecoat material, and one or more further basecoat films (B.1.2.x) with one or more other basecoat materials.

If a first basecoat film is produced by applying a first basecoat material, and a second basecoat film by applying the same basecoat material, then obviously both films are based on the same basecoat material. However, the application evidently takes place in two stages, and so the corresponding basecoat material in the sense of the method of the invention corresponds to a first basecoat material (b.1.2.a) and to a further basecoat material (b.1.2.z). The system described is frequently also referred to as a one-coat basecoat film system produced in two applications. Since, however, especially in real-life OEM finishing, the technical circumstances in a painting facility mean that a certain time span always passes between the first application and the second application, during which the substrate, for example the automobile body, is conditioned at 15 to 35° C., for example, and hence is flashed off, the characterization of this system as a two-coat basecoat system is clearer in a formal sense. The operating regime described, then, should be assigned to the second variant of the method of the invention.

In stage (1.1), the applied basecoat material (b.1.1), or the corresponding basecoat film (B.1.1), following application, is flashed off for example at 15 to 35° C. for a period of, for example, 0.5 to 30 minutes, and/or is subjected to intermediate drying at a temperature of preferably 40 to 90° C. for a period of, for example, 1 to 20 minutes. Preference is given to first flashing off at 15 to 35° C. for a period of 0.5 to 30 minutes and then intermediately drying at 40 to 90° C. for a period of, for example, 1 to 20 minutes.

In stage (1.2), the basecoat materials (b.1.2.x) applied are generally flashed off and/or intermediately dried separately and/or together. In stage (1.2) too, preference is given to flashing off at 15 to 35° C. for a period of 0.5 to 30 minutes and intermediately drying at 40 to 90° C. for a period of, for example, 1 to 20 minutes. The sequence of flash-off and/or intermediate drying operations on individual or plural basecoat films (B.1.2.x) can be adjusted according to the demands of the individual case.

The basecoat film (B.1.1) or the basecoat films (B.1.2.x) are not cured within stage (1) of the method of the invention. This is clearly and unambiguously apparent from stage (3) of the method of the invention, described below. Since the basecoat films are not cured until stage (3), they cannot be cured at the earlier stage (1), since curing in stage (3) would not be possible any longer in that case.

In stage (1), therefore, the basecoat films are not exposed to conditions which may already result in curing. These conditions are of course dependent on the particular basecoat materials employed. This always means in particular, however, that the basecoat films are exposed preferably only to temperatures of less than 100° C. With further preference they are exposed only to temperatures of less than 100° C. and additionally are exposed to temperatures between 60 and 100° C. for not longer than 15 minutes. The reason is that it is under these conditions that in general the preferred basecoat materials, i.e. physically curable basecoat materials and/or thermochemically curable, externally crosslinking, one-component basecoat materials, are not cured. This is because the physical curing that comes into question at the stated temperatures cannot be concluded, generally speaking, within the stated times.

The application of the basecoat materials (b.1.1) and (b.1.2.x) is made such that the basecoat film (B.1.1) and the individual basecoat films (B.1.2.x), after the curing which takes place in stage (3), have a film thickness of, for example, 3 to 50 micrometers, preferably 5 to 40 micrometers.

In stage (2) of the method of the invention, a clearcoat film (K) is produced directly on (2.1) the basecoat film (B.1.1), or (2.2) the topmost basecoat film (B.1.2.z). This production procedure is accomplished by appropriate application of a clearcoat material (k). The clearcoat film (K) is therefore disposed directly on the basecoat film (B.1.1), or directly on the topmost basecoat film (B.1.2.z).

The clearcoat material (k) may be any transparent coating composition that is known per se to the person skilled in the art in this context. "Transparent" should be understood to mean that a film formed with the coating composition is not coloredly hiding, but instead has a constitution such that the color of the underlying basecoat system is visible. This, as is known, however, does not rule out the possibility of pigments also being present in minor amounts in the clearcoat material, with the capability of supporting, for example, the depth of color of the overall system.

The coating compositions in question are aqueous or solventborne, transparent, physically curing or thermochemically curable coating compositions, and may be formulated either as one-component or as two-component or multicomponent coating compositions. In addition, powder slurry clearcoat materials are also suitable. Preference is given to solvent-based clearcoat materials.

The clearcoat materials (k) used may especially be thermochemically and/or actinochemically curable. More particularly, they are thermochemically curable and externally crosslinking. Preference is given to thermochemically curable two-component clearcoat materials.

The clearcoat materials therefore customarily and preferably comprise at least one (first) polymer as binder having functional groups, and also at least one crosslinker having a functionality complementary to the functional groups of the binder. Preference is given to using at least one hydroxy-functional poly(meth)acrylate polymer as a binder and a free polyisocyanate as a crosslinking agent.

The clearcoat material (k) is applied by methods known to those skilled in the art for application of liquid coating compositions, for example by dipping, bar coating, spraying, rolling or the like. Preference is given to employing spray application methods, for example compressed air spraying (pneumatic application), and electrostatic spray application (ESTA).

After application, the clearcoat material (k) or the corresponding clearcoat (K) is flashed off or intermediately dried at 15 to 35° C. for a period of 0.5 to 30 min. Flash-off and intermediate drying conditions of this kind apply especially to the preferred case that the clearcoat material (k) is a thermochemically curable two-component coating composition. However, this does not rule out the possibility that the clearcoat material (k) is a coating composition curable in another way and/or that other flash-off and/or intermediate drying conditions are used.

The application of the clearcoat material (k) is effected in such a way that the clearcoat film, after the curing effected in stage (3), has a film thickness of, for example, 15 to 80 micrometers, preferably 20 to 65 micrometers, especially preferably 25 to 60 micrometers.

Of course, the method of the invention does not rule out the application, after the clearcoat material (k) has been applied, of further coating compositions, as for example further clearcoat materials, and the consequent production of further coating films, as for example further clearcoat films. Such further coating films are then likewise cured in the stage (3) described below, or they are not applied until after stage (3) and in that case are cured separately. Preferably, however, only the one clearcoat material (k) is applied, and is then cured as described in stage (3).

In stage (3) of the method of the invention, there is joint curing of (3.1) the basecoat film (B.1.1) and the clearcoat film (K), or (3.2) of the basecoat films (B.1.2.x) and the clearcoat film (K).

The curing conditions are of course guided by the basecoat and clearcoat materials used, and possibly by the conditions as well under which the basecoat film (B.1.1) or the basecoat films (B.1.2.x) have been flashed off and intermediately dried.

The joint curing takes place preferably at temperatures between 40 and 100° C., more preferably between 60 and 100° C., for a period of, for example, 5 to 60 minutes, preferably 20 to 60 minutes. In this way, on the one hand, it is possible at any rate for the thermochemically curable two-component clearcoat materials used with preference to be thermochemically cured. On the other hand, the basecoat materials employed with preference, in other words physically curable basecoat materials and/or thermochemically curable, externally crosslinking, one-component basecoat materials, are at any rate physically cured. At the same time, the possibility of the plastics substrates undergoing decomposition or deformation is avoided. Where, for example, a basecoat material used requires a significantly longer period for physical curing, it is of course possible to carry out longer curing in the final curing operation and/or the flashing-off and/or intermediate drying in stage (1) of the method is carried out, for example, for a longer time period at the necessary temperatures.

After stage (3) of the method of the invention has ended, the result is a multicoat paint system of the invention.

The Basecoat Materials for Use in Accordance with the Invention

The basecoat material (b.1.1) for inventive use comprises at least one, preferably precisely one, specific aqueous polyurethane-polyurea dispersion (PD).

The polymer particles present in the dispersion are therefore polyurethane-polyurea-based. Such polymers are preparable in principle by conventional polyaddition of, for example, polyisocyanates with polyols and also polyamines. With a view to the dispersion (PD) to be used in accordance with the invention and to the polymer particles it comprises, however, there are specific conditions to be observed, which are elucidated below.

The polyurethane-polyurea particles present in the aqueous polyurethane-polyurea dispersion (PD) possess a gel fraction of at least 50% (for measurement method, see Examples section). Moreover, the polyurethane-polyurea particles present in the dispersion (PD) possess an average particle size of 40 to 2000 nanometers (nm) (for measurement method, see Examples section).

The dispersions (PD) of the invention, therefore, are microgel dispersions. A microgel dispersion, as is known, is a polymer dispersion in which, on the one hand, the polymer is present in the form of comparatively small particles, having particle sizes of 0.02 to 10 micrometers, for example ("micro"-gel). On the other hand, however, there is at least partial intramolecular crosslinking of the polymer particles. The latter means that the polymer structures present within a particle equate to a typical macroscopic network, with three-dimensional network structure. Viewed macroscopically, however, a microgel dispersion of this kind continues to be a dispersion of polymer particles in a dispersion medium, water for example. While the particles may also in part have crosslinking bridges to one another (purely from the preparation process, this can hardly be ruled out), the system is nevertheless a dispersion with discrete particles included therein that have a measurable average particle size. Because of the molecular nature, however, these particles are in solution in suitable organic solvents; macroscopic networks, by contrast, would merely swell.

Because the microgels represent structures which lie between branched and macroscopically crosslinked systems, they combine, consequently, the characteristics of macromolecules with network structure that are soluble in suitable organic solvents, and insoluble macroscopic networks, and so the fraction of the crosslinked polymers can be determined, for example, only following isolation of the solid polymer, after removal of water and any organic solvents, and subsequent extraction. The phenomenon utilized here is that whereby the microgel particles, originally soluble in suitable organic solvents, retain their inner network structure after isolation, and behave, in the solid, like a macroscopic network. Crosslinking may be verified via the experimentally accessible gel fraction. The gel fraction is ultimately the fraction of the polymer from the dispersion that cannot be molecularly dispersely dissolved, as an isolated solid, in a solvent. It is necessary here to rule out a further increase in the gel fraction from crosslinking reactions subsequent to the isolation of the polymeric solid. This insoluble fraction corresponds in turn to the fraction of the polymer that is present in the dispersion in the form of intramolecularly crosslinked particles or particle fractions.

In the context of the present invention, it has emerged that only microgel dispersions with polymer particles having particle sizes in the range essential to the invention have all of the required performance properties. Particularly important, therefore, is a combination of fairly low particle sizes and, nevertheless, a significant crosslinked fraction or gel fraction. Only in this way is it possible to achieve the advantageous properties, more particularly the combination of good optical and mechanical properties on the part of multicoat paint systems, on the one hand, and a high solids content and good storage stability of aqueous basecoat materials, on the other. Thus, for example, dispersions having comparatively larger particles, in the range of, for example, greater than 2 micrometers (average particle size), possess increased sedimentation behavior and hence an impaired storage stability.

The polyurethane-polyurea particles present in the aqueous polyurethane-polyurea dispersion (PD) preferably possess a gel fraction of at least 60%, more preferably of at least 70%, especially preferably of at least 80%. The gel fraction may therefore amount to up to 100% or approximately 100%, as for example 99% or 98%. In such a case, then, the entire—or almost the entire—polyurethane-polyurea polymer is present in the form of crosslinked particles.

The polyurethane-polyurea particles present in the dispersion (PD) preferably possess an average particle size of 40 to 1500 nm, more preferably of 100 to 1000 nm, more preferably 110 to 500 nm, and even more preferably 120 to 300 nm. An especially preferred range is from 130 to 250 nm.

The polyurethane-polyurea dispersion (PD) obtained is aqueous. The expression "aqueous" is known in this context to the skilled person. It refers fundamentally to a system which comprises as its dispersion medium not exclusively or primarily organic solvents (also called solvents); instead, it comprises as its dispersion medium a significant fraction of water. Preferred embodiments of the aqueous character, defined on the basis of the maximum amount of organic solvents and/or on the basis of the amount of water, are described later on below.

The polyurethane-polyurea particles comprise anionic groups and/or groups which can be converted into anionic groups (that is, groups which can be converted into anionic groups by the use of known neutralizing agents, and also neutralizing agents specified later on below, such as bases).

As the skilled person is aware, these groups are, for example, carboxylic, sulfonic and/or phosphonic acid groups, especially preferably carboxylic acid groups (functional groups which can be converted into anionic groups by neutralizing agents), and also anionic groups derived from the aforementioned functional groups, such as, more particularly, carboxylate, sulfonate and/or phosphonate groups, preferably carboxylate groups. The introduction of such groups is known to increase the dispersibility in water. Depending on the conditions selected, the stated groups may be present proportionally or almost completely in the one form (carboxylic acid, for example) or the other form (carboxylate). One particular influencing factor resides, for example, in the use of the neutralizing agents which have already been addressed and which are described in even more detail later on below. Irrespective of the form in which the stated groups are present, however, a uniform nomenclature is frequently selected in the context of the present invention, for greater ease of comprehension. Where, for example, a particular acid number is specified for a polymer, or where such a polymer is referred to as carboxy-functional, this reference hereby always embraces not only the carboxylic acid groups but also the carboxylate groups. If there is to be any differentiation in this respect, such differentiation is dealt with, for example, using the degree of neutralization.

The stated groups can be introduced into polymers such as the polyurethane-polyurea particles, for example, as is known, via the use of corresponding starting compounds when preparing the polymers. The starting compounds in that case comprise the corresponding groups, carboxylic acid groups for example, and are polymerized into the polymer via further functional groups, hydroxyl groups for example. More in-depth details are described later on below.

Preferred anionic groups and/or groups which can be converted into anionic groups are carboxylate groups and carboxylic acid groups, respectively. Based on the solids content, the polyurethane-polyurea polymer present in the dispersion in particle form preferably possesses an acid number of 10 to 35 mg KOH/g, more particularly of 15 to 23 mg KOH/g (for measurement method, see Examples section).

The polyurethane-polyurea particles present in the dispersion (PD) preferably comprise, in each case in reacted form, (Z.1.1) at least one polyurethane prepolymer which contains isocyanate groups and comprises anionic groups and/or groups which can be converted into anionic groups, and also (Z.1.2) at least one polyamine comprising two primary amino groups and one or two secondary amino groups.

Where it is said, in the context of the present invention, that polymers, such as the polyurethane-polyurea particles of the dispersion (PD), for example, comprise certain components in reacted form, this means that these particular components are used as starting compounds in the preparation of the polymers in question. Depending on the nature of the starting compounds, the respective reaction takes place to give the target polymer according to various mechanisms. In the present case, accordingly, in the preparation of polyurethane-polyurea particles or polyurethane-polyurea polymers, components (Z.1.1) and (Z.1.2) are reacted with one another by reaction of the isocyanate groups of (Z.1.1) with the amino groups of (Z.1.2), to form urea bonds. The polymer then of course contains the amino groups and isocyanate groups present beforehand, in the form of urea groups—that is, in their correspondingly reacted form. In spite of this, ultimately, the polymer comprises the two components (Z.1.1) and (Z.1.2), since apart from the reacted isocyanate groups and amino groups, the components remain unchanged. For clarity, accordingly, it is said that the respective polymer comprises the components, in each case in reacted form. The meaning of the expression "the polymer comprises, in reacted form, a component (X)" can therefore be equated with the meaning of the expression "in the preparation of the polymer, component (X) was used".

It follows from the above that anionic groups and/or groups which can be converted into anionic groups are introduced preferably via the abovementioned polyurethane prepolymer, containing isocyanate groups, into the polyurethane-polyurea particles.

The polyurethane-polyurea particles preferably consist of the two components (Z.1.1) and (Z.1.2), meaning that they are prepared from these two components.

The aqueous dispersion (PD) may be obtained by a special three-stage process, this being preferred. In the context of the description of this process, preferred embodiments of components (Z.1.1) and (Z.1.2) are given as well.

The process comprises (I)

preparing a composition (Z) comprising, based in each case on the total amount of the composition (Z), (Z.1) 15 to 65 wt % of at least one intermediate containing isocyanate groups and having blocked primary amino groups, its preparation comprising the reaction
  (Z.1.1) of at least one polyurethane prepolymer containing isocyanate groups and comprising anionic groups and/or groups which can be converted into anionic groups, with
  (Z.1.2a) at least one polyamine comprising two blocked primary amino groups and one or two free secondary amino groups,
  by addition reaction of isocyanate groups from (Z.1.1) with free secondary amino groups from (Z.1.2), (Z.2) 35 to 85 wt % of at least one organic solvent which possesses a solubility in water of not more than 38 wt % at a temperature of 20° C., (II)

dispersing the composition (Z) in aqueous phase, and (III)

at least partly removing the at least one organic solvent (Z.2) from the dispersion obtained in (II).

In the first step (I) of this method, therefore, a specific composition (Z) is prepared.

The composition (Z) comprises at least one, preferably precisely one, specific intermediate (Z.1) which contains isocyanate groups and has blocked primary amino groups.

The preparation of the intermediate (Z.1) involves the reaction of at least one polyurethane prepolymer (Z.1.1), containing isocyanate groups and comprising anionic groups and/or groups which can be converted into anionic groups, with at least one polyamine (Z.1.2a), derived from a polyamine (Z.1.2), comprising at least two blocked primary amino groups and at least one free secondary amino group.

Polyurethane polymers containing isocyanate groups and comprising anionic groups and/or groups which can be converted into anionic groups are known in principle. For the purposes of the present invention, component (Z.1.1) is referred to as prepolymer, for greater ease of comprehension. This component is in fact a polymer which can be referred to as a precursor, since it is used as a starting component for preparing another component, specifically the intermediate (Z.1).

For preparing the polyurethane prepolymers (Z.1.1) which contain isocyanate groups and comprise anionic groups and/or groups which can be converted into anionic groups, it is possible to employ the aliphatic, cycloaliphatic, aliphatic-cycloaliphatic, aromatic, aliphatic-aromatic and/or cycloaliphatic-aromatic polyisocyanates that are known to the skilled person. Diisocyanates are used with preference. Mention may be made, by way of example, of the following diisocyanates: 1,3- or 1,4-phenylene diisocyanate, 2,4- or 2,6-tolylene diisocyanate, 4,4'- or 2,4'-diphenylmethane diisocyanate, 1,4- or 1,5-naphthylene diisocyanate, diisocyanatodiphenyl ether, trimethylene diisocyanate, tetramethylene diisocyanate, ethylethylene diisocyanate, 2,3-dimethylethylene diisocyanate, 1-methyltrimethylene diisocyanate, pentamethylene diisocyanate, 1,3-cyclopentylene diisocyanate, hexamethylene diisocyanate, cyclohexylene diisocyanate, 1,2-cyclohexylene diisocyanate, octamethylene diisocyanate, trimethylhexane diisocyanate, tetramethylhexane diisocyanate, decamethylene diisocyanate, dodecamethylene diisocyanate, tetradecamethylene diisocyanate, isophorone diisocyanate (IPDI), 2-isocyanatopropylcyclohexyl isocyanate, dicyclohexylmethane 2,4'-diisocyanate, dicyclohexylmethane 4,4'-diisocyanate, 1,4- or 1,3-bis(isocyanatomethyl)cyclohexane, 1,4- or 1,3- or 1,2-diisocyanatocyclohexane, 2,4- or 2,6-diisocyanato-1-methylcyclohexane, 1-isocyanatomethyl-5-isocyanato-1,3,3-trimethylcyclohexane, 2,3-bis(8-isocyanatooctyl)-4-octyl-5-hexylcyclohexene, tetramethylxylylene diisocyanates (TMXDI) such as m-tetramethylxylylene diisocyanate, or mixtures of these polyisocyanates. Also possible, of course, is the use of different dimers and trimers of the stated diisocyanates, such as uretdiones and isocyanurates. Polyisocyanates of higher isocyanate functionality may also be used. Examples thereof are tris(4-isocyanatophenyl)methane, 1,3,4-triisocyanatobenzene, 2,4,6-triisocyanatotoluene, 1,3,5-tris(6-isocyanatohexylbiuret), bis(2,5-diisocyanato-4-methylphenyl)methane. The functionality may optionally be lowered by reaction with monoalcohols and/or secondary amines. Preference, however, is given to using diisocyanates, more particularly to using aliphatic diisocyanates, such as hexamethylene diisocyanate, isophorone diisocyanate (IPDI), dicyclohexylmethane 4,4'-diisocyanate, 2,4- or 2,6-diisocyanato-1-methylcyclohexane, and m-tetramethylxylylene diisocyanate (m-TMXDI). An isocyanate is termed aliphatic when the isocyanate groups are attached to aliphatic groups; in other words, when there is no aromatic carbon present in alpha position to an isocyanate group.

The prepolymers (Z.1.1) are prepared by reacting the polyisocyanates with polyols, more particularly diols, generally with formation of urethanes.

Examples of suitable polyols are saturated or olefinically unsaturated polyester polyols and/or polyether polyols. Polyols used more particularly are polyester polyols, especially those having a number-average molecular weight of 400 to 5000 g/mol (for measurement method, see Examples section). Such polyester polyols, preferably polyester diols, may be prepared in a known way by reaction of corresponding polycarboxylic acids, preferably dicarboxylic acids, and/or their anhydrides with corresponding polyols, preferably diols, by esterification. It is of course optionally possible in addition, even proportionally, to use monocarboxylic acids and/or monoalcohols for the preparation. The polyester diols are preferably saturated, more particularly saturated and linear.

Examples of suitable aromatic polycarboxylic acids for preparing such polyester polyols, preferably polyester diols, are phthalic acid, isophthalic acid, and terephthalic acid, of which isophthalic acid is advantageous and is therefore used with preference. Examples of suitable aliphatic polycarboxylic acids are oxalic acid, malonic acid, succinic acid, glutaric acid, adipic acid, pimelic acid, suberic acid, azelaic acid, sebacic acid, undecanedicarboxylic acid, and dodecanedicarboxylic acid, or else hexahydrophthalic acid, 1,3-cyclohexanedicarboxylic acid, 1,4-cyclohexanedicarboxylic acid, 4-methylhexahydrophthalic acid, tricyclodecanedicarboxylic acid, and tetrahydrophthalic acid. As dicarboxylic acids it is likewise possible to use dimer fatty acids or dimerized fatty acids, which, as is known, are mixtures prepared by dimerizing unsaturated fatty acids and are available, for example, under the commercial names Radiacid (from Oleon) or Pripol (from Croda). In the context of the present invention, the use of such dimer fatty acids for preparing polyester diols is preferred. Polyols used with preference for preparing the prepolymers (Z.1.1) are therefore polyester diols which have been prepared using dimer fatty acids. Especially preferred are polyester diols in whose preparation at least 50 wt %, preferably 55 to 75 wt %, of the dicarboxylic acids employed are dimer fatty acids.

Examples of corresponding polyols for preparing polyester polyols, preferably polyester diols, are ethylene glycol, 1,2- or 1,3-propanediol, 1,2-, 1,3-, or 1,4-butanediol, 1,2-, 1,3-, 1,4-, or 1,5-pentanediol, 1,2-, 1,3-, 1,4-, 1,5-, or 1,6-hexanediol, neopentyl hydroxypivalate, neopentyl glycol, diethylene glycol, 1,2-, 1,3-, or 1,4-cyclohexanediol, 1,2-, 1,3-, or 1,4-cyclohexanedimethanol, and trimethylpentanediol. Diols are therefore used with preference. Such polyols and/or diols may of course also be used directly for preparing the prepolymer (Z.1.1), in other words reacted directly with polyisocyanates.

Further possibilities for use in preparing the prepolymers (Z.1.1) are polyamines such as diamines and/or amino alcohols. Examples of diamines include hydrazine, alkyl- or cycloalkyldiamines such as propylene diamine and 1-amino-3-aminomethyl-3,5,5-trimethylcyclohexane, and examples of amino alcohols include ethanolamine or diethanolamine.

The prepolymers (Z.1.1) comprise anionic groups and/or groups which can be converted into anionic groups. In order to introduce the stated groups, it is possible, during the preparation of the prepolymers (Z.1.1), to use starting compounds which as well as groups for reaction in the preparation of urethane bonds, preferably hydroxyl groups, further comprise the abovementioned groups, carboxylic acid groups for example. In this way the groups in question are introduced into the prepolymer.

Corresponding compounds contemplated for introducing the preferred carboxylic acid groups are polyether polyols and/or polyester polyols, provided they contain carboxyl groups. However, compounds used with preference are at any rate low molecular weight compounds which have at least one carboxylic acid group and at least one functional group reactive toward isocyanate groups, preferably hydroxyl groups. In the context of the present invention, the expression "low molecular weight compound", as opposed to higher molecular weight compounds, especially polymers, should be understood to mean those to which a discrete molecular weight can be assigned, as preferably monomeric compounds. A low molecular weight compound is thus, more particularly, not a polymer, since the latter are always a mixture of molecules and have to be described using mean molecular weights. Preferably, the term "low molecular weight compound" is understood to mean that the corresponding compounds have a molecular weight of less than 300 g/mol. Preference is given to the range from 100 to 200 g/mol.

Compounds preferred in this context are, for example, monocarboxylic acids containing two hydroxyl groups, as for example dihydroxypropionic acid, dihydroxysuccinic acid, and dihydroxybenzoic acid. Very particular compounds are alpha,alpha-dimethylolalkanoic acids such as 2,2-dimethylolacetic acid, 2,2-dimethylolpropionic acid, 2,2-dimethylolbutyric acid and 2,2-dimethylolpentanoic acid, especially 2,2-dimethylolpropionic acid.

Preferably, therefore, the prepolymers (Z.1.1) are carboxy-functional. They preferably possess an acid number, based on the solids content, of 10 to 35 mg KOH/g, more particularly 15 to 23 mg KOH/g.

The number-average molecular weight of the prepolymers may vary widely and is situated for example in the range from 2000 to 20 000 g/mol, preferably from 3500 to 6000 g/mol (for measurement method, see Examples section).

The prepolymer (Z.1.1) contains isocyanate groups. Preferably, based on the solids content, it possesses an isocyanate content of 0.5 to 6.0 wt %, preferably 1.0 to 5.0 wt %, especially preferably 1.5 to 4.0 wt % (for measurement method, see Examples section).

Given that the prepolymer (Z.1.1) contains isocyanate groups, the hydroxyl number of the prepolymer is likely in general to be very low. The hydroxyl number of the prepolymer, based on the solids content, is preferably less than 15 mg KOH/g, more particularly less than 10 mg KOH/g, even more preferably less than 5 mg KOH/g (for measurement method, see Examples section).

The prepolymers (Z.1.1) may be prepared by known and established methods in bulk or solution, especially preferably by reaction of the starting compounds in organic solvents, such as preferably methyl ethyl ketone, at temperatures of, for example, 60 to 120° C., and optionally with use of catalysts typical for polyurethane preparation. Such catalysts are known to those skilled in the art, one example being dibutyltin laurate. The procedure here is of course to select the proportion of the starting components such that the product, in other words the prepolymer (Z.1.1), contains isocyanate groups. It is likewise directly apparent that the solvents ought to be selected in such a way that they do not enter into any unwanted reactions with the functional groups of the starting compounds, in other words being inert toward these groups to the effect that they do not hinder the reaction of these functional groups. The preparation is preferably actually carried out in an organic solvent (Z.2) as described later on below, since this solvent must in any case be present in the composition (Z) for preparation in stage (I) of the method.

As already indicated above, the groups in the prepolymer (Z.1.1) which can be converted into anionic groups may also be present proportionally as correspondingly anionic groups, as a result of the use of a neutralizing agent, for example. In this way it is possible to adjust the water-dispersibility of the prepolymers (Z.1.1) and hence also of the intermediate (Z.1).

Neutralizing agents contemplated include, in particular, the known basic neutralizing agents such as, for example, carbonates, hydrogencarbonates, or hydroxides of alkali metals and alkaline earth metals, such as LiOH, NaOH, KOH, or Ca(OH)$_2$ for example. Likewise suitable for the neutralization and preferred for use in the context of the present invention are organic bases containing nitrogen, such as amines, such as ammonia, trimethylamine, triethylamine, tributylamines, dimethylaniline, triphenylamine, dimethylethanolamine, methyldiethanolamine, or triethanolamine, and also mixtures thereof.

The neutralization of the prepolymer (Z.1.1) with the neutralizing agents, more particularly with the nitrogen-containing organic bases, may take place after the preparation of the prepolymer in organic phase, in other words in solution with an organic solvent, more particularly a solvent (Z.2) as described below. The neutralizing agent may of course also be added during or before the beginning of the actual polymerization, in which case, for example, the starting compounds containing carboxylic acid groups are neutralized.

If neutralization of the groups which can be converted into anionic groups, more particularly of the carboxylic acid groups, is desired, the neutralizing agent may be added, for example, in an amount such that a proportion of 35% to 65% of the groups is neutralized (degree of neutralization). Preference is given to a range from 40% to 60% (for method of calculation, see Examples section).

The prepolymer (Z.1.1) is preferably neutralized as described after its preparation and before its use for preparing the intermediate (Z.1).

The preparation of the intermediate (Z.1), described herein, involves the reaction of the above-described prepolymer (Z.1.1) with at least one, preferably precisely one, polyamine (Z.1.2a) derived from a polyamine (Z.1.2).

The polyamine (Z.1.2a) comprises two blocked primary amino groups and one or two free secondary amino groups.

Blocked amino groups, as is known, are those in which the hydrogen residues on the nitrogen that are present inherently in free amino groups have been substituted by reversible reaction with a blocking agent. In view of the blocking, the amino groups cannot be reacted like free amino groups, via condensation reactions or addition reactions, and in this respect are therefore nonreactive, thereby differentiating them from free amino groups. The reactions known per se for the amino groups are then evidently only enabled after the reversibly adducted blocking agent has been removed again, thereby producing in turn the free amino groups. The principle therefore resembles the principle of capped or blocked isocyanates, which are likewise known within the field of polymer chemistry.

The primary amino groups of the polyamine (Z.1.2a) may be blocked with the blocking agents that are known per se, as for example with ketones and/or aldehydes. Such blocking in that case, with release of water, produces ketimines and/or aldimines which no longer contain any nitrogen-hydrogen bonds, meaning that typical condensation reactions or addition reactions of an amino group with a further functional group, such as an isocyanate group, are unable to take place.

Reaction conditions for the preparation of a blocked primary amine of this kind, such as of a ketimine, for example, are known. Thus, for example, such blocking may be realized with introduction of heat to a mixture of a primary amine with an excess of a ketone which functions at the same time as a solvent for the amine. The water of reaction formed is preferably removed during the reaction, in order to prevent the possibility otherwise of reverse reaction (deblocking) of the reversible blocking.

The reaction conditions for deblocking of blocked primary amino groups are also known per se. For example, simply the transfer of a blocked amine to the aqueous phase is sufficient to shift the equilibrium back to the side of the deblocking, as a result of the concentration pressure that then exists, exerted by the water, and thereby to generate free primary amino groups and also a free ketone, with consumption of water.

It follows from the above that in the context of the present invention, a clear distinction is being made between blocked and free amino groups. If, nevertheless, an amino group is specified neither as being blocked nor as being free, the reference there is to a free amino group.

Preferred blocking agents for blocking the primary amino groups of the polyamine (Z.1.2a) are ketones. Particularly preferred among the ketones are those which constitute an organic solvent (Z.2) as described later on below. The reason is that these solvents (Z.2) must be present in any case in the composition (Z) for preparation in stage (I) of the method. It has already been indicated above that the preparation of corresponding primary amines blocked with a ketone proceeds to particularly good effect in an excess of the ketone. Through the use of ketones (Z.2) for the blocking, therefore, it is possible to use the correspondingly preferred preparation procedure for blocked amines, without any need for costly and inconvenient removal of the blocking agent, which may be unwanted. Instead, the solution of the blocked amine can be used directly in order to prepare the intermediate (Z.1). Preferred blocking agents are acetone, methyl ethyl ketone, methyl isobutyl ketone, diisopropyl ketone, cyclopentanone, or cyclohexanone, particularly preferred agents are the ketones (Z.2) methyl ethyl ketone and methyl isobutyl ketone.

The preferred blocking with ketones and/or aldehydes, more particularly ketones, and the accompanying preparation of ketimines and/or aldimines, has the advantage, moreover, that primary amino groups are blocked selectively. Secondary amino groups present are evidently unable to be blocked, and therefore remain free. Consequently a polyamine (Z.1.2a) which as well as the at least two blocked primary amino groups also contains one or two free secondary amino groups can be prepared readily by way of the stated preferred blocking reactions from a polyamine (Z.1.2) which contains free secondary and primary amino groups.

The polyamines (Z.1.2a) may be prepared by blocking of the primary amino groups of polyamines (Z.1.2) comprising two primary amino groups and one or two secondary amino groups. Ultimately suitable are all aliphatic, aromatic, or araliphatic (mixed aliphatic-aromatic) polyamines (Z.1.2) which are known per se and which have two primary amino groups and one or two secondary amino groups. This means that as well as the stated amino groups, there may per se be any aliphatic, aromatic, or araliphatic groups present. Possible, for groups on a secondary amino group, or divalent groups located between two amino groups.

Aliphatic in the context of the present invention is an epithet referring to all organic groups which are not aromatic. For example, the groups present as well as the stated amino groups may be aliphatic hydrocarbon groups, in other words groups which consist exclusively of carbon and hydrogen and which are not aromatic. These aliphatic hydrocarbon groups may be linear, branched, or cyclic, and may be saturated or unsaturated. These groups may of course also include both cyclic and linear or branched moieties. It is also possible for aliphatic groups to contain heteroatoms, more particularly in the form of bridging groups such as ether, ester, amide and/or urethane groups. Possible aromatic groups are likewise known and require no further elucidation.

Preferably, the polyamines (Z.1.2a) possess two blocked primary amino groups and one or two free secondary amino groups, and as primary amino groups they possess exclusively blocked primary amino groups, and as secondary amino groups they possess exclusively free secondary amino groups.

Preferably, in total, the polyamines (Z.1.2a) possess three or four amino groups, these groups being selected from the group consisting of blocked primary amino groups and free secondary amino groups.

Especially preferred polyamines (Z.1.2a) are those which consist of two blocked primary amino groups, one or two free secondary amino groups, and also aliphatically saturated hydrocarbon groups.

Analogously preferred embodiments apply to the polyamines (Z.1.2), where these contain free primary amino groups instead of blocked primary amino groups.

Examples of preferred polyamines (Z.1.2) from which polyamines (Z.1.2a) may be prepared by blocking of the primary amino groups are diethylenetriamine, 3-(2-aminoethyl) aminopropylamine, dipropylenetriamine, and also Nl-(2-(4-(2-aminoethyl)piperazin-1-yl)ethyl)ethane-1,2-diamine (one secondary amino group, two primary amino groups for blocking) and triethylenetetramine, and also N,N'-bis(3-aminopropyl)ethylenediamine (two secondary amino groups, two primary amino groups for blocking).

To the skilled person it is clear that not least for reasons associated with pure technical synthesis, there cannot always be a theoretically idealized quantitative conversion in the blocking of primary amino groups. For example, if a particular amount of a polyamine is blocked, the proportion of the primary amino groups that are blocked in the blocking process may be, for example, 95 mol % or more (determinable by IR spectroscopy; see Examples section). Where a polyamine in the nonblocked state, for example, possesses two free primary amino groups, and where the primary amino groups of a certain quantity of this amine are then blocked, it is said in the context of the present invention that this amine has two blocked primary amino groups if a fraction of more than 95 mol % of the primary amino groups present in the quantity employed are blocked. This is due on the one hand to the fact, already stated, that from a technical synthesis standpoint, a quantitative conversion cannot always be realized. On the other hand, the fact that more than 95 mol % of the primary amino groups are blocked means that the major fraction of the total amount of the amines used for blocking does in fact contain exclusively blocked primary amino groups, specifically exactly two blocked primary amino groups.

The preparation of the intermediate (Z.1) involves the reaction of the prepolymer (Z.1.1) with the polyamine (Z.1.2a) by addition reaction of isocyanate groups from (Z.1.1) with free secondary amino groups from (Z.1.2a).

This reaction, which is known per se, then leads to the attachment of the polyamine (Z.1.2a) onto the prepolymer (Z.1.1), with formation of urea bonds, ultimately forming the intermediate (Z.1). It will be readily apparent that in the preparation of the intermediate (Z.1), preference is therefore given to not using any other amines having free or blocked secondary or free or blocked primary amino groups.

The intermediate (Z.1) can be prepared by known and established techniques in bulk or solution, especially preferably by reaction of (Z.1.1) with (Z.1.2a) in organic solvents. It is immediately apparent that the solvents ought to be selected in such a way that they do not enter into any unwanted reactions with the functional groups of the starting compounds, and are therefore inert or largely inert in their behavior toward these groups. As solvent in the preparation, preference is given to using, at least proportionally, an organic solvent (Z.2) as described later on below, especially methyl ethyl ketone, even at this stage, since this solvent must in any case be present in the composition (Z) to be prepared in stage (I) of the process of the invention. With preference a solution of a prepolymer (Z.1.1) in a solvent (Z.2) is mixed with a solution of a polyamine (Z.1.2a) in a solvent (Z.2), and the reaction described can take place.

Of course, the intermediate (Z.1) thus prepared may be neutralized during or after the preparation, using neutralizing agents already described above, in the manner likewise described above for the prepolymer (Z.1.1). It is nevertheless preferred for the prepolymer (Z.1.1) to be neutralized prior to its use for preparing the intermediate (Z.1), in a manner described above, so that neutralization during or after the preparation of (Z.1) is no longer relevant. In such a case, therefore, the degree of neutralization of the prepolymer (Z.1.1) can be equated with the degree of neutralization of the intermediate (Z.1). Where there is no further addition of neutralizing agents at all in the context of the process of the invention, therefore, the degree of neutralization of the polymers present in the ultimately prepared dispersions (PD) of the invention can also be equated with the degree of neutralization of the prepolymer (Z.1.1).

The intermediate (Z.1) possesses blocked primary amino groups. This can evidently be achieved in that the free secondary amino groups are brought to reaction in the reaction of the prepolymer (Z.1.1) and of the polyamine (Z.1.2a), but the blocked primary amino groups are not reacted. Indeed, as already described above, the effect of the blocking is that typical condensation reactions or addition reactions with other functional groups, such as isocyanate groups, are unable to take place. This of course means that the conditions for the reaction should be selected such that the blocked amino groups also remain blocked, in order thereby to provide an intermediate (Z.1). The skilled person knows how to set such conditions, which are brought about, for example, by reaction in organic solvents, which is preferred in any case.

The intermediate (Z.1) contains isocyanate groups. Accordingly, in the reaction of (Z.1.1) and (Z.1.2a), the ratio of these components must of course be selected such that the product—that is, the intermediate (Z.1)—contains isocyanate groups.

Since, as described above, in the reaction of (Z.1.1) with (Z.1.2a), free secondary amino groups are reacted with isocyanate groups, but the primary amino groups are not reacted, owing to the blocking, it is first of all immediately clear that in this reaction the molar ratio of isocyanate groups from (Z.1.1) to free secondary amino groups from (Z.1.2a) must be greater than 1. This feature arises implicitly, nevertheless clearly and directly from the feature essential to the invention, namely that the intermediate (Z.1) contains isocyanate groups.

It is nevertheless preferred for there to be an excess of isocyanate groups, defined as below, during the reaction. The molar amounts (n) of isocyanate groups, free secondary amino groups, and blocked primary amino groups, in this preferred embodiment, satisfy the following condition: [n (isocyanate groups from (Z.1.1))–n (free secondary amino groups from (Z.1.2a))]/n (blocked primary amino groups from (Z.1.2a))=1.2/1 to 4/1, preferably 1.5/1 to 3/1, very preferably 1.8/1 to 2.2/1, even more preferably 2/1.

In this preferred embodiment, the intermediate (Z.1), formed by reaction of isocyanate groups from (Z.1.1) with the free secondary amino groups from (Z.1.2a), possesses an excess of isocyanate groups in relation to the blocked primary amino groups. This excess is ultimately achieved by selecting the molar ratio of isocyanate groups from (Z.1.1) to the total amount of free secondary amino groups and blocked primary amino groups from (Z.1.2a) to be large enough that even after the preparation of (Z.1) and the corresponding consumption of isocyanate groups by the reaction with the free secondary amino groups, there remains a corresponding excess of the isocyanate groups.

Where, for example, the polyamine (Z.1.2a) has one free secondary amino group and two blocked primary amino groups, the molar ratio between the isocyanate groups from (Z.1.1) to the polyamine (Z.1.2a) in the especially preferred embodiment is set at 5/1. The consumption of one isocyanate group in the reaction with the free secondary amino group would then mean that 4/2 (or 2/1) was realized for the condition stated above.

The fraction of the intermediate (Z.1) is from 15 to 65 wt %, preferably from 25 to 60 wt %, more preferably from 30 to 55 wt %, especially preferably from 35 to 52.5 wt %, and, in one very particular embodiment, from 40 to 50 wt %, based in each case on the total amount of the composition (Z).

Determining the fraction of an intermediate (Z.1) may be carried out as follows: The solids content of a mixture which besides the intermediate (Z.1) contains only organic solvents is ascertained (for measurement method for determining the solids (also called solids content) see Examples section). The solids content then corresponds to the amount of the intermediate (Z.1). By taking account of the solids content of the mixture, therefore, it is possible to determine or specify the fraction of the intermediate (Z.1) in the composition (Z). Given that the intermediate (Z.1) is preferably prepared in an organic solvent anyway, and therefore, after the preparation, is in any case present in a mixture which comprises only organic solvents apart from the intermediate, this is the technique of choice.

The composition (Z) further comprises at least one specific organic solvent (Z.2).

The solvents (Z.2) possess a solubility in water of not more than 38 wt % at a temperature of 20° C. (for measurement method, see Examples section). The solubility in water at a temperature of 20° C. is preferably less than 30 wt %. A preferred range is from 1 to 30 wt %.

The solvent (Z.2) accordingly possesses a fairly moderate solubility in water, being in particular not fully miscible with water or possessing no infinite solubility in water. A solvent is fully miscible with water when it can be mixed in any proportions with water without occurrence of separation, in other words of the formation of two phases.

Examples of solvents (Z.2) are methyl ethyl ketone, methyl isobutyl ketone, diisobutyl ketone, diethyl ether, dibutyl ether, dipropylene glycol dimethyl ether, ethylene glycol diethyl ether, toluene, methyl acetate, ethyl acetate, butyl acetate, propylene carbonate, cyclohexanone, or mixtures of these solvents. Preference is given to methyl ethyl ketone, which has a solubility in water of 24 wt % at 20° C.

No solvents (Z.2) are therefore solvents such as acetone, N-methyl-2-pyrrolidone, N-ethyl-2-pyrrolidone, tetrahydrofuran, dioxane, N-formylmorpholine, dimethylformamide, or dimethyl sulfoxide.

A particular effect of selecting the specific solvents (Z.2) of only limited solubility in water is that when the composition (Z) is dispersed in aqueous phase, in step (II) of the method, a homogeneous solution cannot be directly formed. It is assumed that the dispersion that is present instead makes it possible for the crosslinking reactions that occur as part of step (II) (addition reactions of free primary amino groups and isocyanate groups to form urea bonds) to take place in a restricted volume, thereby ultimately allowing the formation of the microparticles defined as above.

As well as having the water-solubility described, preferred solvents (Z.2) possess a boiling point of not more than 120° C., more preferably of not more than 90° C. (under atmospheric pressure, in other words 1.013 bar). This has advantages in the context of step (III) of the method, said step being described later on below, in other words the at least partial removal of the at least one organic solvent (Z.2) from the dispersion prepared in step (II) of the method. The reason is evidently that, when using the solvents (Z.2) that are preferred in this context, these solvents can be removed by distillation, for example, without the removal simultaneously of significant quantities of the water introduced in step (II) of the method. There is therefore no need, for example, for the laborious re-addition of water in order to retain the aqueous nature of the dispersion (PD).

The fraction of the at least one organic solvent (Z.2) is from 35 to 85 wt %, preferably from 40 to 75 wt %, more preferably from 45 to 70 wt %, especially preferably from 47.5 to 65 wt %, and, in one very particular embodiment, from 50 to 60 wt %, based in each case on the total amount of the composition (Z).

In the context of the present invention it has emerged that through the specific combination of a fraction as specified above for the intermediate (Z.1) in the composition (Z), and through the selection of the specific solvents (Z.2) it is possible, after the below-described steps (II) and (III), to provide polyurethane-polyurea dispersions which comprise polyurethane-polyurea particles having the requisite particle size, which further have the requisite gel fraction.

The components (Z.1) and (Z.2) described preferably make up in total at least 90 wt % of the composition (Z). Preferably the two components make up at least 95 wt %, more particularly at least 97.5 wt %, of the composition (Z). With very particular preference, the composition (Z) consists of these two components. In this context it should be noted that where neutralizing agents as described above are used, these neutralizing agents are ascribed to the intermediate when calculating the amount of an intermediate (Z.1). The reason is that in this case the intermediate (Z.1) at any rate possesses anionic groups, which originate from the use of the neutralizing agent. Accordingly, the cation that is present after these anionic groups have formed is likewise ascribed to the intermediate.

Where the composition (Z) includes other components, in addition to components (Z.1) and (Z.2), these other components are preferably just organic solvents. The solids content of the composition (Z) therefore corresponds preferably to the fraction of the intermediate (Z.1) in the composition (Z).

The composition (Z) therefore possesses preferably a solids content of 15 to 65 wt %, preferably of 25 to 60 wt %, more preferably of 30 to 55 wt %, especially preferably of 35 to 52.5 wt %, and, in one especially preferred embodiment, of 40 to 50 wt %.

A particularly preferred composition (Z) therefore contains in total at least 90 wt % of components (Z.1) and (Z.2), and other than the intermediate (Z.1) includes exclusively organic solvents.

An advantage of the composition (Z) is that it can be prepared without the use of eco-unfriendly and health-injurious organic solvents such as N-methyl-2-pyrrolidone, dimethylformamide, dioxane, tetrahydrofuran, and N-ethyl-2-pyrrolidone. Preferably, accordingly, the composition (Z) contains less than 10 wt %, preferably less than 5 wt %, more preferably less than 2.5 wt % of organic solvents selected from the group consisting of N-methyl-2-pyrrolidone, dimethylformamide, dioxane, tetrahydrofuran, and N-ethyl-2-pyrrolidone. The composition (Z) is preferably entirely free from these organic solvents.

In a second step (II) of the method described here, the composition (Z) is dispersed in aqueous phase.

It is known, and also follows from what has already been said above, that in step (II), therefore, there is a deblocking of the blocked primary amino groups of the intermediate (Z.1). Indeed, as a result of the transfer of a blocked amine to the aqueous phase, the reversibly attached blocking agent is released, with consumption of water, and free primary amino groups are formed.

It is likewise clear, therefore, that the resulting free primary amino groups are then reacted with isocyanate groups likewise present in the intermediate (Z.1), or in the deblocked intermediate formed from the intermediate (Z.1), by addition reaction, with formation of urea bonds.

It is also known that the transfer to the aqueous phase means that it is possible in principle for the isocyanate groups in the intermediate (Z.1), or in the deblocked intermediate formed from the intermediate (Z.1), to react with the water, with elimination of carbon dioxide, to form free primary amino groups, which can then be reacted in turn with isocyanate groups still present.

Of course, the reactions and conversions referred to above proceed in parallel with one another. Ultimately, as a result, for example, of intermolecular and intramolecular reaction or crosslinking, a dispersion is formed which comprises polyurethane-polyurea particles with defined average particle size and with defined degree of crosslinking or gel fraction.

In step (II) of the method described here, then, the composition (Z) is dispersed in water, there being a deblocking of the blocked primary amino groups of the intermediate (Z.1) and a reaction of the resulting free primary amino groups with the isocyanate groups of the intermediate (Z.1) and also with the isocyanate groups of the deblocked intermediate formed from the intermediate (Z.1), by addition reaction.

Step (II) of the method described here, in other words the dispersing in aqueous phase, may take place in any desired way. This means that ultimately the only important thing is that the composition (Z) is mixed with water or with an aqueous phase. With preference, the composition (Z), which after the preparation may be for example at room temperature, in other words 20 to 25° C., or at a temperature increased relative to room temperature, of 30 to 60° C., for example, can be stirred into water, producing a dispersion. The water already introduced has room temperature, for example. Dispersion may take place in pure water (deionized water), meaning that the aqueous phase consists solely of water, this being preferred. Besides water, of course, the aqueous phase may also include, proportionally, typical auxiliaries such as typical emulsifiers and protective colloids. A compilation of suitable emulsifiers and protective colloids is found in, for example, Houben Weyl, Methoden der organischen Chemie [Methods of Organic Chemistry], volume XIV/1 Makromolekulare Stoffe [Macromolecular compounds], Georg Thieme Verlag, Stuttgart 1961, p. 411 ff.

It is of advantage if in stage (II) of the method, in other words at the dispersing of the composition (Z) in aqueous phase, the weight ratio of organic solvents and water is selected such that the resulting dispersion has a weight ratio of water to organic solvents of greater than 1, preferably of 1.05 to 2/1, especially preferably of 1.1 to 1.5/1.

In step (III) of the method described here, the at least one organic solvent (Z.2) is removed at least partly from the dispersion obtained in step (II). Of course, step (III) of the method may also entail removal of other solvents as well, possibly present, for example, in the composition (Z).

The removal of the at least one organic solvent (Z.2) and of any further organic solvents may be accomplished in any way which is known, as for example by vacuum distillation at temperatures slightly raised relative to room temperature, of 30 to 60° C., for example.

The resulting polyurethane-polyurea dispersion (PD) is aqueous (regarding the basic definition of "aqueous", see earlier on above).

A particular advantage of the dispersion (PD) for use in accordance with the invention is that it can be formulated with only very small fractions of organic solvents, yet enables the advantages described at the outset in accordance with the invention. The dispersion (PD) for use in accordance with the invention comprises preferably not more than 15.0 wt %, especially preferably not more than 10 wt %, very preferably not more than 5 wt %, and more preferably still not more than 2.5 wt % of organic solvents (for measurement method, see Examples section).

The fraction of the polyurethane-polyurea polymer in the dispersion (PD) is preferably 25 to 55 wt %, preferably 30 to 50 wt %, more preferably 35 to 45 wt %, based in each case on the total amount of the dispersion (determined as for the determination described above for the intermediate (Z.1) via the solids content).

The fraction of water in the dispersion (PD) is preferably 45 to 75 wt %, preferably 50 to 70 wt %, more preferably 55 to 65 wt %, based in each case on the total amount of the dispersion.

It is a particular advantage of the dispersion (PD) for use in accordance with the invention that it can be formulated in such a way that it consists to an extent of at least 85 wt %, preferably at least 90.0 wt %, very preferably at least 95 wt %, and more preferably still at least 97.5 wt % of the polyurethane-polyurea particles and water (the associated value comes about through summation of the amount of the particles (that is of the polymer, determined via the solids content) and of the amount of water). It has emerged that in spite of this low fraction of further components such as, in particular, organic solvents, the dispersions are in any case very stable, especially storage-stable. In this way, two relevant advantages are united. First of all, dispersions are provided which can be used in aqueous basecoat materials, where they lead to the performance advantages described at the outset and also in the examples below. Secondly, however, an appropriate formulation freedom is achieved in the preparation of aqueous basecoat materials. This means that additional fractions of organic solvents can be used in the basecoat materials, being necessary, for example, in order to provide appropriate formulation of various components. This, however, does not jeopardize the fundamentally aqueous nature of the basecoat material. On the contrary, the basecoat materials may nevertheless be formulated with comparatively low fractions of organic solvents, and therefore have a particularly good environmental profile.

Even more preferred is for the dispersion, other than the polymer, to include only water and any organic solvents, in the form, for example, of residual fractions, not fully removed in stage (III) of the method. The solids content of the dispersion (PD) is therefore preferably 25% to 55%, preferably 30% to 50%, more preferably 35% to 45%, and more preferably still is in agreement with the fraction of the polymer in the dispersion.

An advantage of the dispersion (PD) is that it can be prepared without the use of eco-unfriendly and health-injurious organic solvents such as N-methyl-2-pyrrolidone, dimethylformamide, dioxane, tetrahydrofuran, and N-ethyl-2-pyrrolidone. Accordingly the dispersion (PD) contains preferably less than 7.5 wt %, preferably less than 5 wt %, more preferably less than 2.5 wt % of organic solvents selected from the group consisting of N-methyl-2-pyrrolidone, dimethylformamide, dioxane, tetrahydrofuran, and N-ethyl-2-pyrrolidone. The dispersion (PD) is preferably entirely free from these organic solvents.

The polyurethane-polyurea polymer present in the dispersion preferably possesses hardly any hydroxyl groups, or none. The OH number of the polymer, based on the solids content, is preferably less than 15 mg KOH/g, more particularly less than 10 mg KOH/g, more preferably still less than 5 mg KOH/g (for measurement method, see Examples section).

The fraction of the at least one dispersion (PD), based on the total weight of the aqueous basecoat material (b.1.1), is preferably 5 to 60 wt %, more preferably 15 to 50 wt %, and very preferably 20 to 45 wt %.

The fraction of the polyurethane-polyurea polymers originating from the dispersions (PD), based on the total weight of the aqueous basecoat material (b.1.1), is preferably from 2.0 to 24.0 wt %, more preferably 6.0 to 20.0 wt %, very preferably 8.0 to 18.0 wt %.

Determining or specifying the fraction of the polyurethane-polyurea polymers originating from the dispersions of the invention in the basecoat material may be done via the determination of the solids content of a dispersion (PD) of the invention which is to be used in the basecoat material.

In the case of a possible particularization to basecoat materials comprising preferred dispersions (PD) in a specific proportional range, the following applies. The dispersions (PD) which do not fall within the preferred group may of course still be present in the basecoat material. In that case the specific proportional range applies only to the preferred group of dispersions (PD). It is preferred nonetheless for the total proportion of dispersions (PD), consisting of dispersions from the preferred group and dispersions which are not part of the preferred group, to be subject likewise to the specific proportional range.

In the case of restriction to a proportional range of 15 to 50 wt % and to a preferred group of dispersions (PD), therefore, this proportional range evidently applies initially only to the preferred group of dispersions (PD). In that case, however, it would be preferable for there to be likewise from 15 to 50 wt % in total present of all originally encompassed dispersions, consisting of dispersions from the preferred group and dispersions which do not form part of the preferred group. If, therefore, 35 wt % of dispersions (PD) of the preferred group are used, not more than 15 wt % of the dispersions of the non-preferred group may be used.

The stated principle is valid, for the purposes of the present invention, for all stated components of the basecoat material and for their proportional ranges—for example, for the pigments specified later on below, or else for the crosslinking agents specified later on below, such as melamine resins.

The basecoat material (b.1.1) for use in accordance with the invention preferably comprises at least one pigment. This comprehends optical effect pigments and/or color pigments that are known per se.

Such color pigments and effect pigments are known to those skilled in the art and are described, for example, in Römpp-Lexikon Lacke and Druckfarben, Georg Thieme Verlag, Stuttgart, New York, 1998, pages 176 and 451. The terms "coloring pigment" and "color pigment" are interchangeable, just like the terms "optical effect pigment" and "effect pigment".

Preferred effect pigments are, for example, platelet-shaped metal effect pigments such as lamellar aluminum pigments, gold bronzes, oxidized bronzes and/or iron oxide-aluminum pigments, pearlescent pigments such as pearl essence, basic lead carbonate, bismuth oxide chloride and/or metal oxide-mica pigments and/or other effect pigments such as lamellar graphite, lamellar iron oxide, multilayer effect pigments composed of PVD films and/or liquid crystal polymer pigments. Particular preference is given to platelet-shaped metal effect pigments, especially lamellar aluminum pigments.

Typical color pigments especially include inorganic coloring pigments such as white pigments such as titanium dioxide, zinc white, zinc sulfide or lithopone; black pigments such as carbon black, iron manganese black, or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

The proportion of the pigments is preferably in the range from 1.0 to 40.0% by weight, preferably 2.0 to 35.0% by weight, more preferably 5.0 to 30.0% by weight, based in each case on the total weight of the aqueous basecoat material (b.1.1).

The aqueous basecoat material (b.1.1) preferably further comprises at least one polymer as binder that is different from the polyurethane-polyurea polymers present in the dispersions (PD), more particularly at least one polymer selected from the group consisting of polyurethanes, polyesters, polyacrylates and/or copolymers of the stated polymers, more particularly polyesters and/or polyurethane polyacrylates. Preferred polyesters are described in, for example, DE 4009858 A1 in column 6 line 53 to column 7 line 61 and column 10 line 24 to column 13 line 3, or WO 2014/033135 A2, page 2 line 24 to page 7 line 10 and also page 28 line 13 to page 29 line 13. Preferred polyurethane-polyacrylate copolymers (acrylated polyurethanes) and their preparation are described in, for example, WO 91/15528 A1, page 3, line 21 to page 20, line 33, and in DE 4437535 A1, page 2, line 27 to page 6, line 22. The described polymers as binders are preferably hydroxy-functional and especially preferably possess an OH number in the range from 15 to 200 mg KOH/g, more preferably from 20 to 150 mg KOH/g. The basecoat materials more preferably comprise at least one hydroxy-functional polyurethane-polyacrylate copolymer, more preferably still at least one hydroxy-functional polyurethane-polyacrylate copolymer and also at least one hydroxy-functional polyester.

The proportion of the further polymers as binders may vary widely and is situated preferably in the range from 1.0 to 25.0 wt %, more preferably 3.0 to 20.0 wt %, very preferably 5.0 to 15.0 wt %, based in each case on the total weight of the basecoat material (b.1.1).

In addition, the basecoat material (b.1.1) may comprise at least one typical crosslinking agent known per se. If it does comprise a crosslinking agent, the agent in question is preferably at least one blocked polyisocyanate and/or an aminoplast resin, especially preferably at least one melamine resin.

Where the basecoat material (b.1.1) does comprise crosslinking agents, the proportion of these crosslinking agents is situated preferably in the range from 0.5 to 20.0 wt %, more preferably 1.0 to 15.0 wt %, very preferably 1.5 to 10.0 wt %, based in each case on the total weight of the basecoat material (b.1.1).

The basecoat material (b.1.1) may further comprise at least one thickener. Suitable thickeners are inorganic thickeners from the group of the phyllosilicates such as lithium aluminum magnesium silicates. It is nevertheless known that coating materials whose profile of rheological properties is determined via the primary or predominant use of such inorganic thickeners are in need of improvement in terms of their solids content, in other words can be formulated only with decidedly low solids contents of less than 20%, for example, without detriment to important performance properties. A particular advantage of the basecoat material (b.1.1) is that it can be formulated without, or without a great fraction of, such inorganic phyllosilicates employed as thickeners. Accordingly, the fraction of inorganic phyllosilicates used as thickeners, based on the total weight of the basecoat material, is preferably less than 0.7 wt %, especially preferably less than 0.3 wt %, and more preferably still less than 0.1 wt %. With very particular preference, the basecoat material is entirely free of such inorganic phyllosilicates used as thickeners.

Instead, the basecoat material may comprise at least one organic thickener, as for example a (meth)acrylic acid-(meth)acrylate copolymer thickener or a polyurethane thickener. Employed with preference are associative thickeners, such as the associative polyurethane thickeners known per se, for example. Associative thickeners, as is known, are water-soluble polymers which have strongly hydrophobic groups at the chain ends or in side chains, and/or whose hydrophilic chains contain hydrophobic blocks or concentrations in their interior. As a result, these polymers possess a surfactant character and are capable of forming micelles in aqueous phase. In similarity with the surfactants, the hydrophilic regions remain in the aqueous phase, while the hydrophobic regions enter into the particles of polymer dispersions, adsorb on the surface of other solid particles such as pigments and/or fillers, and/or form micelles in the aqueous phase. Ultimately a thickening effect is achieved, without any increase in sedimentation behavior. Thickeners of this kind are available commercially, as for example under the trade name Adekanol (from Adeka Corporation).

The proportion of the organic thickeners is preferably in the range from 0 to 5.0 wt %, more preferably 0 to 3.0 wt %, very preferably 0 to 2.0 wt %, based in each case on the total weight of the basecoat material.

A very particular advantage of the basecoat materials (b.1.1) used in accordance with the invention is that they can be formulated without the use of any thickener, yet have outstanding properties in terms of their rheological profile. Achieved in this way in turn is a reduced complexity for the coating material and/or an increase in the formulation freedom for the basecoat material.

Furthermore, the basecoat material (b.1.1) may further comprise at least one further adjuvant. Examples of such adjuvants are salts which are thermally decomposable without residue or substantially without residue, polymers as binders that are curable physically, thermally and/or with actinic radiation and that are different from the polymers already stated as binders, further crosslinking agents, organic solvents, reactive diluents, transparent pigments, fillers, molecularly dispersively soluble dyes, nanoparticles, light stabilizers, antioxidants, deaerating agents, emulsifiers, slip additives, polymerization inhibitors, initiators of radical polymerizations, adhesion promoters, flow control agents, film-forming assistants, sag control agents (SCAs), flame retardants, corrosion inhibitors, waxes, siccatives, biocides, and matting agents. Such adjuvants are used in the customary and known amounts.

The solids content of the basecoat material (b.1.1) may vary according to the requirements of the case in hand. The solids content is guided primarily by the viscosity that is needed for application, more particularly spray application. A particular advantage is that the basecoat material of the invention, for a comparatively high solids content, is able nevertheless to have a viscosity which allows appropriate application.

The solids content of the basecoat material, if it comprises at least one crosslinking agent, is preferably at least 25%, more preferably at least 27.5%, more preferably still at least 30%.

If the basecoat material does not contain crosslinking agent, the solids content is preferably at least 15%, preferably at least 18%, more preferably at least 21%.

Under the stated conditions, in other words at the stated solids contents, preferred basecoat materials (b.1.1) have a viscosity of 40 to 150 mPa·s, more particularly 70 to 110 mPa·s, at 23° C. under a shearing load of 1000 l/s (for further details regarding the measurement method, see Examples section). For the purposes of the present invention, a viscosity within this range under the stated shearing load is referred to as spray viscosity (working viscosity). As is known, coating materials are applied at spray viscosity, meaning that under the conditions then present (high shearing load) they possess a viscosity which in particular is not too high, so as to permit effective application. This means that the setting of the spray viscosity is important, in order to allow a paint to be applied at all by spray methods, and to ensure that a complete, uniform coating film is able to form on the substrate to be coated. A particular advantage is that even a basecoat material (b.1.1) adjusted to spray viscosity possesses a high solids content. The preferred ranges of the solids content, particularly the lower limits, therefore suggest that in the applicable state, preferably, the basecoat material (b.1.1) has comparatively high solids contents.

The basecoat material of the invention is aqueous (regarding the definition of "aqueous", see above).

The fraction of water in the basecoat material (b.1.1) is preferably from 35 to 70 wt %, more preferably 42 to 63 wt %, based in each case on the total weight of the basecoat material.

Even more preferred is for the percentage sum of the solids content of the basecoat material and the fraction of water in the basecoat material to be at least 70 wt %, preferably at least 75 wt %. Among these figures, preference is given to ranges of 75 to 95 wt %, in particular 80 to 90 wt %. In this reporting, the solids content, which traditionally only possesses the unit "%", is reported in "wt %". Since the solids content ultimately also represents a percentage weight figure, this form of representation is justified. If, then, a basecoat material has a solids content of 35% and a water content of 50 wt %, for example, the percentage sum defined above, from the solids content of the basecoat material and the fraction of water in the basecoat material, is 85 wt %.

This means in particular that preferred basecoat materials in principle include only small proportions of environmentally burdensome components such as, in particular, organic solvents, in relation to the solids content of the basecoat material. The ratio of the volatile organic fraction of the basecoat material (in wt %) to the solids content of the basecoat material (in analogy to the depiction above, here in wt %) is preferably from 0.05 to 0.7, more preferably from 0.15 to 0.6. The volatile organic fraction is considered for the purposes of the present invention to be that fraction of the basecoat material which is counted as neither part of the water nor part of the solids content.

Another advantage of the basecoat material (b.1.1) is that it can be prepared without the use of eco-unfriendly and health-injurious organic solvents such as N-methyl-2-pyrrolidone, dimethylformamide, dioxane, tetrahydrofuran, and N-ethyl-2-pyrrolidone. Accordingly, the basecoat material preferably contains less than 10 wt %, preferably less than 5 wt %, more preferably less than 2.5 wt % of organic solvents selected from the group consisting of N-methyl-2-pyrrolidone, dimethylformamide, dioxane, tetrahydrofuran, and N-ethyl-2-pyrrolidone. The basecoat material is preferably entirely free from these organic solvents.

The basecoat materials of the invention can be produced using the mixing assemblies and mixing techniques that are customary and known for the production of basecoat materials.

At least one of the basecoat materials (b.1.2.x) used in the method of the invention has the features essential to the invention as described for the basecoat material (b.1.1). This means in particular that at least one of the basecoat materials (b.1.2.x) comprises at least one aqueous polyurethane-polyurea dispersion (PD). The preferred features and embodiments described within the description of the basecoat material (b.1.1) also apply—preferentially to at least one of the basecoat materials (b.1.2.x).

The method of the invention permits the production of multicoat paint systems
on plastics substrates that exhibit outstanding adhesion to the plastics substrate.

The present invention also relates to an aqueous mixing varnish system for producing aqueous basecoat materials. The mixing varnish system, based in each case on the total weight of the aqueous mixing varnish system, comprises
to 25 wt % of at least one polyurethane-polyurea polymer which originates from at least one dispersion (PD),
0 to 15 wt % of a crosslinking agent selected from the group of aminoplast resins, 3 to 15 wt % of at least one polyester having an OH number in the range from 15 to 200 mg KOH/g, 2 to 10 wt % of at least one polyurethane-polyacrylate copolymer having an OH number in the range from 15 to 200 mg KOH/g, 45 to 55 wt % of water, and 5 to 15 wt % of at least one organic solvent, the components described making up in total at least 90 wt %, preferably at least 95 wt %, of the mixing varnish system.

The mixing varnish system is preferably substantially free from pigments, thus containing less than 1 wt % of pigments. With particular preference it is completely free from pigments.

It has emerged that the mixing varnish system is outstandingly suitable for use in the production of aqueous basecoat materials, owing to individually adapted completion with, in particular, pigments and optionally various additives. A single mixing varnish system can therefore be used in order to produce different aqueous basecoat materials, by subsequent, individual completion. As a result, of course, there is a massive easing of the workload, and hence an increase in the economics, when formulating basecoat materials, particularly on the industrial scale. The mixing varnish system can be produced and stored separately and then completed with corresponding pigment pastes, for example, as and when required.

Accordingly, the present invention also relates to a method for producing aqueous basecoat materials that comprises adding pigments, more particularly in the form of pigment pastes, to a mixing varnish system as described above.

EXAMPLES

Methods of Determination

1. Solids Content

Unless otherwise indicated, the solids content, also referred to as solid fraction hereinafter, was determined in accordance with DIN EN ISO 3251 at 130° C.; 60 min, initial mass 1.0 g. If reference is made in the context of the present invention to an official standard, this of course means the version of the standard that was current on the filing date, or, if no current version exists at that date, then the last current version.

2. Isocyanate Content

The isocyanate content, also referred to below as NCO content, was determined by adding an excess of a 2% strength N,N-dibutylamine solution in xylene to a homogeneous solution of the samples in acetone/N-ethylpyrrolidone (1:1 vol %), by potentiometric back-titration of the amine excess with 0.1 N hydrochloric acid, in a method based on DIN EN ISO 3251, DIN EN ISO 11909, and DIN EN ISO 14896. The NCO content of the polymer, based on solids, can be calculated back via the fraction of a polymer (solids content) in solution.

3. Hydroxyl Number

The hydroxyl number was determined on the basis of R.-P. Krüger, R. Gnauck and R. Algeier, Plaste and Kautschuk, 20, 274 (1982), by means of acetic anhydride in the presence of 4-dimethylaminopyridine as a catalyst in a tetrahydrofuran (THF)/dimethylformamide (DMF) solution at room temperature, by fully hydrolyzing the excess of acetic anhydride remaining after acetylation and conducting a potentiometric back-titration of the acetic acid with alcoholic potassium hydroxide solution. Acetylation times of 60 minutes were sufficient in all cases to guarantee complete conversion.

4. Acid Number

The acid number was determined on the basis of DIN EN ISO 2114 in homogeneous solution of tetrahydrofuran (THF)/water (9 parts by volume of THF and 1 part by volume of distilled water) with ethanolic potassium hydroxide solution.

5. Degree of Neutralization

The degree of neutralization of a component x was calculated from the amount of substance of the carboxylic acid groups present in the component (determined via the acid number) and the amount of substance of the neutralizing agent used.

6. Amine Equivalent Mass

The amine equivalent mass (solution) serves for determining the amine content of a solution, and was ascertained as follows. The sample for analysis was dissolved at room temperature in glacial acetic acid and titrated against 0.1N perchloric acid in glacial acetic acid in the presence of crystal violet. The initial mass of the sample and the consumption of perchloric acid gave the amine equivalent mass (solution), the mass of the solution of the basic amine that is needed to neutralize one mole of perchloric acid.

7. Degree of blocking of the primary amino groups

The degree of blocking of the primary amino groups was determined by means of IR spectrometry using a Nexus FT IR spectrometer (from Nicolet) with the aid of an IR cell (d=25 m, KBr window) at the absorption maximum at 3310 $cm^{-1}$ on the basis of concentration series of the amines used and standardization to the absorption maximum at 1166 $cm^{-1}$ (internal standard) at 25° C.

8. Solvent Content

The amount of an organic solvent in a mixture, as for example in an aqueous dispersion, was determined by means of gas chromatography (Agilent 7890A, 50 m silica capillary column with polyethylene glycol phase or 50 m silica capillary column with polydimethylsiloxane phase, helium carrier gas, 250° C. split injector, 40-220° C. oven temperature, flame ionization detector, 275° C. detector temperature, n-propyl glycol as internal standard).

9. Number-Average Molar Mass

The number-average molar mass ($M_n$) was determined, unless otherwise indicated, by means of a vapor pressure osmometer 10.00 (from Knauer) on concentration series in toluene at 50° C. with benzophenone as calibration substance for the determination of the experimental calibration constant of the instrument used, by the method of E. Schröder, G. Müller, K. F. Arndt, "Leitfaden der Polymercharakterisierung" [Principles of polymer characterization], Akademie-Verlag, Berlin, pp. 47-54, 1982.

10. Average Particle Size

The average particle size (volume average) of the polyurethane-polyurea particles present in the dispersions (PD) of the invention was determined in the context of the present invention by means of photon correlation spectroscopy (PCS).

Employed specifically for the measurement was a Malvern Nano S90 (from Malvern Instruments) at 25±1° C. The instrument covers a size range from 3 to 3000 nm and was equipped with a 4 mW He—Ne laser at 633 nm. The dispersions (PD) were diluted with particle-free, deionized water as dispersing medium, before being subjected to measurement in a 1 ml polystyrene cell at suitable scattering intensity. Evaluation took place using a digital correlator, with the assistance of the Zetasizer analysis software, version 6.32 (from Malvern Instruments). Measurement took place five times, and the measurements were repeated on a second, freshly prepared sample. The standard deviation of a 5-fold determination was ≤4%. The maximum deviation of the arithmetic mean of the volume average (V-average mean) of five individual measurements was ±15%. The reported average particle size (volume average) is the arithmetic mean of the average particle size (volume average) of the individual preparations. Verification was carried out using polystyrene standards having certified particle sizes between 50 to 3000 nm.

11. Gel Fraction

The gel fraction of the polyurethane-polyurea particles (microgel particles) present in the dispersions (PD) of the invention is determined gravimetrically in the context of the present invention. Here, first of all, the polymer present was isolated from a sample of an aqueous dispersion (PD) (initial mass 1.0 g) by freeze-drying. Following determination of the solidification temperature—the temperature after which the electrical resistance of the sample shows no further change when the temperature is lowered further—the fully frozen sample underwent its main drying, customarily in the drying vacuum pressure range between 5 mbar and 0.05 mbar, at a drying temperature lower by 10° C. than the solidification temperature. By graduated increase in the temperature of the heated surfaces beneath the polymer to 25° C., rapid freeze-drying of the polymers was achieved; after a drying time of typically 12 hours, the amount of isolated polymer (solid fraction, determined by the freeze-drying) was constant and no longer underwent any change even on prolonged freeze-drying. Subsequent drying at a temperature of the surface beneath the polymer of 30° C. with the ambient pressure reduced to maximum (typically between 0.05 and 0.03 mbar) produced optimum drying of the polymer.

The isolated polymer was subsequently sintered in a forced air oven at 130° C. for one minute and thereafter extracted for 24 hours at 25° C. in an excess of tetrahydrofuran (ratio of tetrahydrofuran to solid fraction=300:1). The insoluble fraction of the isolated polymer (gel fraction) was then separated off on a suitable frit, dried in a forced air oven at 50° C. for 4 hours, and subsequently reweighed.

It was further ascertained that at the sintering temperature of 130° C., with variation in the sintering times between one minute and twenty minutes, the gel fraction found for the microgel particles is independent of sintering time. It can therefore be ruled out that crosslinking reactions subsequent to the isolation of the polymeric solid increase the gel fraction further.

The gel fraction determined in this way in accordance with the invention is also called gel fraction (freeze-dried).

In parallel, a gel fraction, hereinafter also called gel fraction (130° C.), was determined gravimetrically, by isolating a polymer sample from aqueous dispersion (initial mass 1.0 g) at 130° C. for 60 minutes (solids content). The mass of the polymer was ascertained, after which the polymer was extracted in an excess of tetrahydrofuran at 25° C., in analogy to the procedure described above, for 24 hours, after which the insoluble fraction (gel fraction) was separated off, dried, and reweighed.

12. Solubility in Water

The solubility of an organic solvent in water was determined at 20° C. as follows. The respective organic solvent and water were combined in a suitable glass vessel, mixed, and the mixture was subsequently equilibrated. The amounts of water and of the solvent were selected such that two phases separate from one another were obtained after the equilibration. After the equilibration, a sample is taken from the aqueous phase (that is, the phase containing more water than organic solvent) using a syringe, and this sample is diluted with tetrahydrofuran in a 1/10 ratio, the fraction of the solvent being determined by means of gas chromatography (for conditions see section 8. Solvent content).

If two phases do not form irrespective of the amounts of water and the solvent, the solvent is miscible with water in any weight ratio. This solvent that is therefore infinitely soluble in water (acetone, for example) is therefore at any rate not a solvent (Z.2).

13. Volume solids content (calculated):

The volume solids was calculated according to VdL-RL 08 [German Paint Industrial Association Guideline], "Determining the solids volume of anticorrosion coating materials as basis for productivity calculations", Verband der Lackindustrie e.V., December 1999 version. The volume solids VSC (solids volume) was calculated according to the following formula, incorporating the physical properties of the relevant materials used (density of the solvents, density of the solids):

$$VSC=(density\ (wet\ coating) \times solid\ fraction\ (wet\ coating))/density\ (baked\ coating)$$

VSC volume solids content in %
density (wet coating): calculated density of the wet coating material from the density of the individual components (density of solvents and density of solids) in g/cm$^3$
solid fraction (wet coating) solids content (in %) of the wet coating, determined according to DIN EN ISO 3251 at 130° C., 60 minutes, initial mass 1.0 g.
density (baked coating): density of the baked coating material on the metal panel in g/cm$^3$ Preparation of a Dispersion (PD)
A dispersion (PD) was prepared as follows:
a) Preparation of a Partly Neutralized Prepolymer Solution In a reaction vessel equipped with stirrer, internal thermometer, reflux condenser, and electrical heating, 559.7 parts by weight of a linear polyester polyol and 27.2 parts by weight of dimethylolpropionic acid (from GEO Speciality Chemicals) were dissolved under nitrogen in 344.5 parts by weight of methyl ethyl ketone. The linear polyester diol was prepared beforehand from dimerized fatty acid (Pripol® 1012, from Croda), isophthalic acid (from BP Chemicals), and hexane-1,6-diol (from BASF SE) (weight ratio of the starting materials: dimeric fatty acid to isophthalic acid to hexane-1,6-diol=54.00:30.02:15.98), and had a hydroxyl number of 73 mg KOH/g solid fraction, an acid number of 3.5 mg KOH/g solid fraction, a calculated number-average molar mass of 1379 g/mol, and a number-average molar mass as determined via vapor pressure osmometry of 1350 g/mol.

Added in succession to the resulting solution at 30° C. were 213.2 parts by weight of dicyclohexylmethane 4,4'-diisocyanate (Desmodur® W, Bayer MaterialScience) with an isocyanate content of 32.0 wt %, and 3.8 parts by weight of dibutyltin dilaurate (from Merck). The mixture was then heated to 80° C. with stirring. Stirring was continued at this temperature until the isocyanate content of the solution was constant at 1.49 wt %. Thereafter 626.2 parts by weight of methyl ethyl ketone were added to the prepolymer and the reaction mixture was cooled to 40° C. When 40° C. had been reached, 11.8 parts by weight of triethylamine (from BASF SE) were added dropwise over the course of two minutes and the batch was stirred for a further 5 minutes.

b) Reaction of the Prepolymer with Diethylenetriaminediketimine

Then 30.2 parts by weight of a 71.9 wt % dilution of diethylenetriaminediketimine in methyl isobutyl ketone were mixed in over the course of one minute (ratio of prepolymer isocyanate groups to diethylenetriaminediketimine (having a secondary amino group): 5:1 mol/mol, corresponding to two NCO groups per blocked primary amino group), and the reaction temperature rose by 1° C. briefly following addition to the prepolymer solution. The dilution of diethylenetriaminediketimine in methyl isobutyl ketone was prepared beforehand by azeotropic removal of water of reaction in the reaction of diethylenetriamine (from BASF SE) with methyl isobutyl ketone in methyl isobutyl ketone at 110-140° C. Adjustment to an amine equivalent mass (solution) of 124.0 g/eq was carried out by dilution with methyl isobutyl ketone. Blocking of the primary amino groups of 98.5% was determined by means of IR spectroscopy, on the basis of the residual absorption at 3310 cm$^{-1}$. The solids content of the polymer solution containing isocyanate groups was found to be 45.3%.

c) Dispersion and Vacuum Distillation

After 30 minutes of stirring at 40° C., the contents of the reactor were dispersed in 1206 parts by weight of deionized water (23° C.) over the course of 7 minutes. Methyl ethyl ketone was distilled off under reduced pressure at 45° C. from the resulting dispersion, and any losses of solvent and water were compensated with deionized water, to give a solids content of 40 wt %. A white, stable, solids-rich, low-viscosity dispersion containing crosslinked particles was obtained, and showed no sedimentation whatsoever even after 3 months.

The characteristics of the resulting microgel dispersion were as follows:

| | |
|---|---|
| Solids content (130° C., 60 minutes, 1 g): | 40.2 wt % |
| Methyl ethyl ketone content (GC): | 0.2 wt % |
| Methyl isobutyl ketone content (GC): | 0.1 wt % |
| Viscosity (23° C., rotary viscometer, shear rate = 1000/s): | 15 mPa·s |
| Acid number | 17.1 mg KOH/g |

| | Solids content |
|---|---|
| Degree of neutralization (calculated) | 49% |
| pH (23° C.) | 7.4 |
| Particle size (photocorrelation spectroscopy, volume average) | 167 nm |
| Gel fraction (freeze-dried) | 85.1 wt % |
| Gel fraction (130° C.) | 87.3 wt % |

Preparation of Waterborne Basecoat Materials for Inventive Use

The components listed in Table 1 were stirred together in the order stated to form aqueous mixing varnish systems. While mixing varnish system 1 contains a melamine resin as crosslinking agent, mixing varnish system 2 is entirely free from crosslinking agents. Both mixing varnish systems include the above-described dispersion (PD) and are completely free from thickeners such as inorganic thickeners, for example.

TABLE 1

Mixing varnish systems 1 and 2

| Component | Mixing varnish system 1 parts by weight | Mixing varnish system 2 parts by weight |
|---|---|---|
| Dispersion (PD) | 55.000 | 54.000 |
| Butyl glycol | 5.300 | 4.500 |
| Water | 8.300 | 11.000 |
| Polyester prepared as per page 28 lines 13 to 33 of WO 2014/033135 A2 | 5.400 | — |
| Polyester dispersion; prepared as per example D, column 16 lines 37-59 of DE 4009858 A1 | — | 12.500 |
| Polyurethane-polyacrylate copolymer dispersion, prepared as per page 7, line 55 to page 8 line 23 of DE 4437535 A1 | 9.700 | 9.000 |
| Aqueous solution of dimethylethanolamine (10% strength) | 1.600 | 3.300 |
| Polypropylene glycol | 1.400 | 1.500 |
| TMDD BG 52 (BASF) (contains 48 wt % butyl glycol) | 3.200 | 3.000 |
| Melamin-formaldehyde resin (Resimene 755) | 10.100 | — |

Starting from the mixing varnish systems described in Table 1, different solid-color aqueous basecoat materials, and color and effect aqueous basecoat materials, were produced. For this purpose, the mixing varnish systems were made up with the desired tinting pastes and optionally with further additives and solvents. Accordingly it is possible depending on requirement, for example, to use UV protection additives and/or additives for the flow or for reducing the surface tension.

Tables 2 to 5 show the compositions of the aqueous basecoat materials produced, with the components stated having been mixed in the stated order. The constituents of the mixing varnish systems are also listed individually here, since while it is advantageous it is nevertheless not mandatory to use the mixing varnish systems. The same basecoat materials result from corresponding combining of the individual components in the stated order.

All aqueous basecoat materials (BC) had a pH of 7.8 to 8.6 and a spray viscosity of 70 to 110 mPa·s under a shearing load of 1000 s$^{-1}$, measured using a rotational viscometer (Rheomat RM 180 instrument from Mettler-Toledo) at 23° C.

TABLE 2

Basecoat materials 1 (gray) and 2 (white), based on mixing varnish system 1

| Component | BC 1 (gray) parts by weight | BC 2 (white) parts by weight |
|---|---|---|
| Dispersion (PD) | 35.396 | 22.963 |
| Butyl glycol | 3.411 | 2.213 |
| Water | 5.342 | 3.465 |
| Polyester prepared as per page 28 lines 13 to 33 of WO 2014/033135 A2 | 3.475 | 2.255 |
| Polyurethane-polyacrylate copolymer dispersion, prepared as per page 7, line 55 to page 8 line 23 of DE 4437535 A1 | 6.243 | 4.050 |

TABLE 2-continued

Basecoat materials 1 (gray) and 2 (white), based on mixing varnish system 1

| Component | BC 1 (gray) parts by weight | BC 2 (white) parts by weight |
|---|---|---|
| Aqueous solution of dimethylethanolamine (10% strength) | 1.030 | 0.668 |
| Polypropylene glycol | 0.901 | 0.585 |
| TMDD BG 52 (BASF) (contains 48 wt % butyl glycol) | 2.059 | 1.336 |
| Melamine-formaldehyde resin (Resimene 755) | 6.500 | 4.217 |
| Catalyst solution (AMP-PTSA solution) | 0.891 | — |
| Tinting paste (black) | 1.485 | — |
| Tinting paste (white) | 27.228 | 48.880 |
| Tinting paste (black) | — | 0.255 |
| TINUVIN 384-2, 95% MPA | — | 0.611 |
| Tinuvin 123 | — | 0.407 |
| Water | 5.050 | 7.230 |
| Aqueous solution of dimethylethanolamine (10% strength) | 0.990 | 0.611 |

Basecoat materials 1 and 2 are stable on storage at 40° C. for at least 4 weeks, meaning that within this time they exhibit no sedimentation tendency at all and no significant change (less than 15%) in the low-shear viscosity (shearing load of 1 s$^{-1}$, measured using a rotational viscometer). Basecoat material 1 has a solids content of 42% and a calculated volume solids of 35%. Basecoat material 2 has a solids content of 47% and a calculated volume solids of 35%.

TABLE 3

Basecoat materials 3 (gray) and 4 (white), based on mixing varnish system 2

| Component | BC 3 (gray) parts by weight | BC 4 (white) parts by weight |
|---|---|---|
| Dispersion (PD) | 38.591 | 24.923 |
| Butyl glycol | 3.216 | 2.077 |
| Water | 7.861 | 5.077 |
| Polyester dispersion; prepared as per example D, column 16 lines 37-59 of DE 4009858 A1 | 8.933 | 5.769 |
| Polyurethane-polyacrylate copolymer dispersion, prepared as per page 7, line 55 to page 8 line 23 of DE 4437535 A1 | 6.432 | 4.154 |
| Aqueous solution of dimethylethanolamine (10% strength) | 2.323 | 1.500 |
| Polypropylene glycol | 1.072 | 0.692 |
| TMDD BG 52 (BASF) (contains 48 wt % butyl glycol) | 2.144 | 1.385 |
| Tinting paste (white) | 25.000 | 47.000 |
| Tinting paste (black) | 1.500 | 0.250 |
| Water | 2.000 | 7.500 |
| Aqueous solution of dimethylethanolamine (10% strength) | 0.850 | 0.800 |

Basecoat materials 3 and 4 are stable on storage at 40° C. for at least 4 weeks, meaning that within this time they exhibit no sedimentation tendency at all and no significant change (less than 15%) in the low-shear viscosity (shearing load of 1 s$^{-1}$, measured using a rotational viscometer). Basecoat material 3 has a solids content of 38% and a calculated volume solids of 32%. Basecoat material 4 has a solids content of 42% and a calculated volume solids of 31%.

TABLE 4

Basecoat materials 5 (silver) and 6 (red), based on mixing varnish system 1

| Component | BC 5 (silver) parts by weight | BC 6 (red) parts by weight |
|---|---|---|
| Dispersion (PD) | 30.733 | 30.483 |
| Butyl glycol | 2.962 | 2.937 |
| Water | 4.638 | 4.600 |
| Polyester prepared as per page 28 lines 13 to 33 of WO 2014/033135 A2 | 3.017 | 2.993 |
| Polyurethane-polyacrylate copolymer dispersion, prepared as per page 7, line 55 to page 8 line 23 of DE 4437535 A1 | 5.421 | 5.376 |
| Aqueous solution of dimethylethanolamine (10% strength) | 0.894 | 0.887 |
| Polypropylene glycol | 0.782 | 0.776 |
| TMDD BG 52 (BASF) (contains 48 wt % butyl glycol) | 1.788 | 1.774 |
| Melamine-formaldehyde resin (Resimene 755) | 5.644 | 5.598 |
| Tinting paste (black) | — | 0.764 |
| Tinting paste (red) | — | 18.442 |
| Aluminum pigment (ALU STAPA IL HYDROLAN 2192 NO. 5) | 6.348 | — |
| Aluminum pigment (ALU STAPA IL HYDROLAN 2197 NO. 5) | 2.727 | — |
| Aluminum pigment (PALIOCROM-ORANGE L2804 (ex EH 0) | — | 0.764 |
| Butyl glycol | 5.722 | 0.764 |
| Polyester; prepared as per example D, column 16 lines 37-59 of DE 4009858 A1 | 5.722 | 0.764 |
| Aqueous solution of dimethylethanolamine (10% strength) | 0.805 | 0.076 |
| Mica pigment (MEARLIN EXT. FINE RUSSET 459 V) | — | 2.246 |
| Mica pigment (MEARLIN EXT. SUPER RUSSET 459 Z) | — | 0.764 |
| Mixing varnish, prepared as per column 11, lines 1 to 13 of EP 1534792 B1 | — | 9.365 |
| TINUVIN 384-2, 95% MPA | 0.536 | 0.640 |
| Tinuvin 123 | 0.358 | 0.430 |
| BYK-381 | — | 0.478 |
| Water | 21.314 | 8.122 |
| Aqueous solution of dimethylethanolamine (10% strength) | 0.590 | 0.956 |

Basecoat materials 5 and 6 are stable on storage at 40° C. for at least 4 weeks, meaning that within this time they exhibit no sedimentation tendency at all and no significant change (less than 15%) in the low-shear viscosity (shearing load of 1 s$^{-1}$, measured using a rotational viscometer). Basecoat material 5 has a solids content of 31% and a calculated volume solids of 27%. Basecoat material 6 has a solids content of 38% and a calculated volume solids of 34%.

TABLE 5

Basecoat materials 7 (silver) and 8 (red), based on mixing varnish system 2

| Component | BC 7 (silver) parts by weight | BC 8 (red) parts by weight |
| --- | --- | --- |
| Dispersion (PD) | 31.355 | 30.283 |
| Butyl glycol | 2.613 | 2.524 |
| Water | 6.387 | 6.169 |
| Polyester dispersion; prepared as per example D, column 16 lines 37-59 of DE 4009858 A1 | 7.258 | 7.010 |
| Polyurethane-polyacrylate copolymer dispersion, prepared as per page 7, line 55 to page 8 line 23 of DE 4437535 A1 | 5.226 | 5.047 |
| Aqueous solution of dimethylethanolamine (10% strength) | 1.887 | 1.822 |
| Polypropylene glycol | 0.871 | 0.841 |
| TMDD BG 52 (BASF) (contains 48 wt % butyl glycol) | 1.742 | 1.682 |
| Tinting paste (black) | | 0.540 |
| Tinting paste (red) | | 12.800 |
| Aluminum pigment (ALU STAPA IL HYDROLAN 2192 NO. 5) | 4.666 | |
| Aluminum pigment (ALU STAPA IL HYDROLAN 2197 NO. 5) | 2.000 | |
| Aluminum pigment (PALIOCROM-ORANGE L2804 (ex EH 0) | | 0.540 |
| Mica pigment (MEARLIN EXT. FINE RUSSET 459 V) | | 1.620 |
| Mica pigment (MEARLIN EXT. SUPER RUSSET 459 Z) | | 0.540 |
| Mixing varnish prepared as per page 11, lines 1 to 13 of EP 1534792 B1 | 13.332 | 8.100 |
| Butyl glycol | 5.000 | 2.700 |
| Organic thickener (PAc thick., AS S130 sol.) | 7.500 | 5.400 |
| Water | 10.000 | 10.000 |
| Water | 4.000 | 4.000 |
| Aqueous solution of dimethylethanolamine (10% strength) | 1.700 | 2.000 |

Basecoat materials 7 and 8 are stable on storage at 40° C. for at least 4 weeks, meaning that within this time they exhibit no sedimentation tendency at all and no significant change (less than 15%) in the low-shear viscosity (shearing load of 1 s$^{-1}$, measured using a rotational viscometer). Basecoat material 7 has a solids content of 19% and a calculated volume solids of 22%. Basecoat material 8 has a solids content of 24% and a calculated volume solids of 21%.

Production of the Abovementioned Tinting Pastes:

The tinting paste (black) was produced from 25 parts by weight of an acrylated polyurethane dispersion produced as per international patent application WO 91/15528, binder dispersion A, 10 parts by weight of carbon black, 0.1 part by weight of methyl isobutyl ketone, 1.36 parts by weight of dimethylethanolamine (10% in demineralized water), 2 parts by weight of a commercial polyether (Pluriol® P900 from BASF SE), and 61.45 parts by weight of deionized water.

The tinting paste (white) was produced from 43 parts by weight of an acrylated polyurethane dispersion produced as per international patent application WO 91/15528, binder dispersion A, 50 parts by weight of titanium rutile 2310, 3 parts by weight of 1-propoxy-2-propanol, and 4 parts by weight of deionized water.

The tinting paste (red) was produced from 38.4 parts by weight of an acrylated polyurethane dispersion prepared as per international patent application WO 91/15528 binder dispersion A, 47.1 parts by weight of Bayferrox® 13 BM/P, 0.6 part by weight of dimethylethanolamine (10% strength in DI water), 4.7 parts by weight of a commercial polyether (Pluriol® P900 from BASF SE), 2 parts by weight of butyl glycol, and 7.2 parts by weight of deionized water.

Production of a Waterborne Basecoat Material C1 for Comparative Use

| Component | BC C1 (silver) parts by weight |
| --- | --- |
| 3% Na—Mg phyllosilicate solution | 21.0 |
| Water | 1.80 |
| Polyurethane-polyacrylate copolymer dispersion, prepared as per page 7, line 55 to page 8 line 23 of DE 4437535 A1 | 3.50 |
| TMDD BG 52 (BASF) (contains 48 wt % butyl glycol) | 0.4 |
| Water | 3.00 |
| Rheovis ® PU1250 (BASF) | 0.1 |
| Butyl glycol | 0.1 |
| Water | 3.00 |
| Butyl glycol | 4.50 |
| Polyester dispersion; prepared as per example D, column 16 lines 37-59 of DE 4009858 A1 | 2.00 |
| TMDD BG 52 (BASF) (contains 48 wt % butyl glycol) | 0.30 |
| Melamine-formaldehyde resin (Luwipal 052) | 3.80 |
| Aqueous solution of dimethylethanolamine (10% strength) | 0.20 |
| Polypropylene glycol | 0.90 |
| Water | 2.00 |
| Polyurethane-polyacrylate copolymer dispersion, prepared as per page 24 line 14 to page 26 line 6 and page 34 line 26 to page 35 line 30 of WO 2015/007427 A1 | 18.00 |
| TMDD BG 52 (BASF) (contains 48 wt % butyl glycol) | 0.50 |
| Aqueous solution of dimethylethanolamine (10% strength) | 0.50 |
| Water | 3.00 |
| Rheovis ® AS S130 (BASF) | 0.50 |
| Water | 7.50 |
| Butanol | 1.50 |
| Water | 2.00 |
| Aluminum pigment (ALU STAPA Hydrolux VP51284) | 0.80 |
| Aluminum pigment (ALU STAPA Hydrolux 2192) | 3.50 |
| Butyl glycol | 5.20 |
| Polyester dispersion; prepared as per example D, column 16 lines 37-59 of DE 4009858 A1 | 2.60 |
| Aqueous solution of dimethylethanolamine (10% strength) | 0.30 |
| Water | 4.50 |
| Triisobutyl phosphate | 1.00 |

Basecoat material C1 is stable on storage at 40° C. for at least 4 weeks, meaning that within this time it exhibits no sedimentation tendency at all and no significant change (less than 15%) in the low-shear viscosity (shearing load of 1 s$^{-1}$, measured using a rotational viscometer). It has a solids content of 19% and a calculated volume solids of 16%.

Production of Multicoat Paint Systems Using Basecoat Materials 1 to 8 and C1, and Performance Investigation of these Paint Systems Plastics substrates used for coating were flaming-pretreated Hifax panels (PP/EPDM blend). Optionally, a cured surfacer coat was then produced on the flamed substrates, using a commercial primer-surfacer (compare Table A).

Subsequently, a color and/or effect basecoat material was applied via electrostatic spray application in a film thickness of 20 micrometers, followed by flashing off at room temperature for 10 minutes and then by intermediate drying at 80° C. for 10 minutes. Applied atop this intermediately dried basecoat film was a commercial two-component clearcoat material in a film thickness of 35-45 micrometers, by electrostatic spray application, and the overall system was then again flashed off at room temperature for 10 minutes and subsequently cured at 80° C. for 30 minutes.

The multicoat paint systems produced in this way had their adhesion properties investigated. Investigations conducted were the cross-cut test to DIN EN ISO 2409, the PV3.14.7 stonechip test to DIN EN ISO 20567-1, the PV1503 steam jet test with adaptation to DIN 55662, optionally in combination with the PV3.16.1 water condensation test (CH) to DIN EN ISO 6270-2. Low scores in these tests correspond to effective adhesion.

Table A shows the corresponding results.

TABLE A

Adhesion properties

|  | Stonechip | Cross-cut before CH | Cross-cut after CH | Steam jet before CH | Steam jet after CH |
|---|---|---|---|---|---|
| Surfacer BS 5 silver | ≤1.5 | ≤1 | ≤1 | ≤1 mm | ≤1 mm |
| BS 5 silver | ≤1.0 | ≤1 | ≤1 | ≤1 mm | ≤1 mm |
| Surfacer BS 2 white | ≤1.0 | ≤1 | ≤1 | ≤1 mm | ≤1 mm |
| BS 2 white | ≤1.0 | ≤1 | ≤1 | ≤1 mm | ≤1 mm |
| Surfacer BS 6 red | ≤1.5 | ≤1 | ≤1 | ≤1 mm | ≤1 mm |
| BS 6 red | ≤2.0 | ≤1 | ≤1 | ≤1 mm | ≤1 mm |
| Surfacer BS 7 silver | ≤1.0 | ≤1 | ≤1 | ≤1 mm | ≤1 mm |
| BS 7 silver | ≤1.0 | ≤1 | ≤1 | ≤1 mm | ≤1 mm |
| Surfacer BS 4 white | ≤1.0 | ≤1 | ≤1 | ≤1 mm | ≤1 mm |
| BS 4 white | ≤1.0 | ≤1 | ≤1 | ≤1 mm | ≤1 mm |
| Surfacer BS 8 red | ≤1.5 | ≤1 | ≤1 | ≤1 mm | ≤1 mm |
| BS 8 red | ≤1.0 | ≤1 | ≤1 | ≤1 mm | ≤1 mm |
| Surfacer BS C1 silver | 1.5 | ≤1 | ≤1 | >3 mm | >3 mm |
| BS C1 silver | 2.0 | ≤1 | ≤1 | >3 mm | >3 mm |

The results show that the adhesion properties of the multicoat paint systems of the invention on plastics substrates are improved significantly by comparison with multicoat paint systems produced using the basecoat material C1. Moreover, the adhesion properties of the multicoat paint systems of the invention are outstanding in spite of the omission of a surfacer.

The invention claimed is:

1. A method for producing a paint system on a plastics substrate, the method comprising:
   (1) producing a basecoat film or a plurality of directly successive basecoat films on the plastics substrate by applying an aqueous basecoat material to the substrate or directly successively applying a plurality of basecoat materials to the substrate;
   (2) producing a clearcoat film directly on the basecoat film or a topmost basecoat film by applying a clearcoat material directly to the basecoat film or the topmost basecoat film; and
   (3) jointly curing the basecoat film and the clearcoat film or the basecoat films and the clearcoat film,
   wherein:
   the aqueous basecoat material or at least one of the basecoat materials comprises at least one aqueous polyurethane-polyurea dispersion comprising polyurethane-polyurea particles;
   the polyurethane-polyurea particles in the dispersion comprise anionic groups, groups which can be converted into anionic groups, or both;
   the polyurethane-polyurea particles comprise, in each case in reacted form:
   at least one polyurethane prepolymer containing isocyanate groups and comprising the anionic groups, the groups which can be converted into anionic groups, or both; and
   at least one polyamine comprising two primary amino groups and one or two secondary amino groups;
   the polyurethane prepolymer does not contain subunits formed from a monoalcohol;
   the polyurethane-polyurea particles present in the dispersion have an average particle size of 40 to 2000 nm; and
   a gel fraction of the polyurethane-polyurea particles present in the dispersion is at least 50%.

2. The method of claim 1, wherein the dispersion comprises at least 90 wt % of the polyurethane-polyurea particles and water.

3. The method of claim 2, wherein the polyamine consists of the one or two secondary amino groups, the two primary amino groups, and also aliphatically saturated hydrocarbon groups.

4. The method of claim 1, wherein the anionic groups, the groups which can be converted into anionic groups, or both, are at least one of carboxylate groups and carboxylic acid groups.

5. The method of claim 1, wherein the polyurethane-polyurea particles present in the dispersion have an average particle size of 110 to 500 nm and a gel fraction of at least 80%.

6. The method of claim 1, wherein the basecoat material or at least one of the basecoat materials further comprises at least one hydroxy-functional polymer, as binder, selected from the group consisting of polyurethanes, polyesters, polyacrylates, and copolymers of these polymers.

7. The method of claim 1, wherein the basecoat material or at least one of the basecoat materials is a one-component coating composition.

8. The method of claim 1, wherein the joint curing (3) is carried out at a temperature between 40 and 100° C. for a period of 5 to 60 minutes.

9. The method of claim 1, wherein the plastics substrate comprises polypropylene/ethylene-propylene-diene copolymer blends.

10. The method of claim 1, wherein the basecoat material and the basecoat materials, if they comprise at least one crosslinking agent, have a solids content of at least 25% and, if the basecoat material and the basecoat materials (b.1.2.x) contain no crosslinking agent, have a solids content of at least 15%.

11. The method of claim 10, wherein the basecoat materials at 23° C. under a shearing load of 1000 l/s have a viscosity of 40 to 150 mPa·s.

12. The method of claim 1, wherein the basecoat material or at least one of the basecoat materials further comprises at least one crosslinking agent selected from the group consisting of blocked polyisocyanates and aminoplast resins.

13. The method of claim 1, wherein the prepolymer comprises at least one polyester diol prepared using diols and dicarboxylic acids, at least 50 wt %, of the dicarboxylic acids used in preparing the polyester diols being dimer fatty acids.

14. The method of claim 1, wherein the basecoat material or the basecoat materials are applied by electrostatic spray application or pneumatic spray application.

15. A multicoat paint system produced by the method of claim 1.

* * * * *

UNITED STATES PATENT AND TRADEMARK OFFICE
CERTIFICATE OF CORRECTION

PATENT NO. : 10,363,572 B2
APPLICATION NO. : 15/571515
DATED : July 30, 2019
INVENTOR(S) : Juergen Bauer et al.

Page 1 of 1

It is certified that error appears in the above-identified patent and that said Letters Patent is hereby corrected as shown below:

In the Specification

Column 6, Line 21, "for a period of to 60 minutes," should read --for a period of 10 to 60 minutes,--, Column 20, Line 35, "Nl-" should read --N1- --, Column 24, Lines 33-35, cancel the text beginning with "(Z.1),........bonds." and insert the same at Column 24, Line 32 as the continuation of same paragraph, Column 30, Line 64, should read --10 to 25 wt% of at least one polyurethane-polyurea polymer--.

Signed and Sealed this
Twenty-fourth Day of March, 2020

Andrei Iancu
*Director of the United States Patent and Trademark Office*